US012700069B1

(12) United States Patent (10) Patent No.: US 12,700,069 B1
Gangeh et al. (45) Date of Patent: *Aug. 4, 2026

(54) METHODS AND APPARATUS FOR END-TO-END UNSUPERVISED MULTI-DOCUMENT BLIND IMAGE DENOISING

(71) Applicant: EYGS LLP, London (GB)

(72) Inventors: Mehrdad Jabbarzadeh Gangeh, Mountain View, CA (US); Marcin Plata, Wroclaw (PL); Hamid Reza Motahari-Nezad, Los Altos, CA (US)

(73) Assignee: EYGS LLP, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/449,036

(22) Filed: Jan. 14, 2026

Related U.S. Application Data

(63) Continuation of application No. 19/204,321, filed on May 9, 2025, now Pat. No. 12,555,204, which is a
(Continued)

(51) Int. Cl.
G06T 5/70 (2024.01)

(52) U.S. Cl.
CPC ...... G06T 5/70 (2024.01); G06T 2207/20084 (2013.01)

(58) Field of Classification Search
CPC ... G06T 5/70; G06T 2207/20084; G06T 5/20; G06T 2207/20081; G06T 5/50;
(Continued)

(56) References Cited

U.S. PATENT DOCUMENTS 11,508,037 B2 11/2022 Yang et al.
11,769,239 B1 9/2023 Zhang et al.
(Continued)

FOREIGN PATENT DOCUMENTS

CN 105069794 B 9/2017
CN 110111266 A 8/2019
(Continued)

OTHER PUBLICATIONS

Batson et al., "Noise2Self: Blind Denoising by Self-Supervision," Proceedings of Machine Learning Research (PMLR), In Proceedings of the 36th International Conference on Machine Learning, (May 24, 2019), 97:524-533.
(Continued)

*Primary Examiner* — Jose L Couso
(74) *Attorney, Agent, or Firm* — COOLEY LLP

(57) ABSTRACT

Methods and apparatus for end-to-end unsupervised multi-document blind image denoising is presented. The multi-document blind image denoiser removes various noise types from noisy documents without paired target cleaned documents and preserves the contents for optical character recognition. The end-to-end unsupervised multi-document blind image denoiser integrates a Mixture of Experts with a cycle-consistent GAN as the base network that effectively removes multiple types of noise, including salt & pepper noise, blurred and/or faded text, as well as watermarks from documents at various levels of intensity.

20 Claims, 11 Drawing Sheets

Related U.S. Application Data continuation of application No. 17/962,853, filed on Oct. 10, 2022, now Pat. No. 12,333,689.

(58) Field of Classification Search

CPC . G06T 5/60; G06T 2207/30168; G06T 7/002; G06T 3/4046; G06T 9/002; G06T 2207/20076; G06T 2211/441; G06V 30/164; G06V 30/41; G06V 10/93; G06V 30/133; G06V 10/454; G06V 10/54; G06V 10/7764; G06V 10/774; G06V 10/82; G06V 10/84; G06V 20/41; G06V 30/18057; G06V 20/698; G06V 30/19173; G06V 30/194; G06F 16/93; G06F 40/242; G06F 40/284; G06F 40/40; G06F 18/213; G06F 18/214; G06F 18/22; G06F 18/241; G06F 18/24; G06F 18/2411; G06F 18/2415; G06F 18/253; G06F 30/27; G06N 3/02; G06N 3/08–088; G06N 3/04; G06N 3/0445; G06N 3/0454; G06N 3/0464; G06N 3/4046; G06N 3/4053; G06N 3/049; G06N 3/0499; G06N 7/00; G06N 7/01; G06N 20/00; G06K 7/1482; Y10S 128/925

See application file for complete search history.

(56) References Cited

U.S. PATENT DOCUMENTS

| | | | |
|---|---|---|---|
| 11,790,492 B1 | 10/2023 | Ahmad et al. | |
| 11,842,460 B1 | 12/2023 | Chen et al. | |
| 12,333,689 B1 | 6/2025 | Gangeh et al. | |
| 12,555,204 B1 | 2/2026 | Gangeh et al. | |
| 2020/0074234 A1 | 3/2020 | Tong et al. | |
| 2020/0175304 A1 | 6/2020 | Vig et al. | |
| 2021/0104021 A1 | 4/2021 | Sohn et al. | |
| 2021/0150674 A1 | 5/2021 | Cai et al. | |
| 2021/0304364 A1* | 9/2021 | Kabaria | G06T 5/50 |
| 2022/0375039 A1 | 11/2022 | Soh et al. | |
| 2022/0398399 A1 | 12/2022 | Muffat et al. | |
| 2023/0058096 A1 | 2/2023 | Ferrés et al. | |
| 2023/0103638 A1 | 4/2023 | Saharia et al. | |
| 2023/0153957 A1 | 5/2023 | Maleky et al. | |
| 2024/0037970 A1 | 2/2024 | Alabi et al. | |

FOREIGN PATENT DOCUMENTS

| | | | |
|---|---|---|---|
| CN | 110223254 A | 9/2019 | |
| CN | 111260586 A * | 6/2020 | G06N 3/045 |

OTHER PUBLICATIONS

Gangeh et al., "End-to-End Unsupervised Document Image Blind Denoising," arXiv:2105.09437v2 [cs.CV], (Oct. 7, 2021), 19 pages.

Gangeh et al., "End-to-End Unsupervised Document Image Blind Denoising," Institute of Electrical and Electronics Engineers (IEEE) Xplore, (Feb. 28, 2022), pp. 7888-7897. (Originally presented at 2021 IEEE/CVF International Conference on Computer Vision (ICCV), Virtual Conference, Oct. 10-17, 2021, Montreal, QC, Canada).

Krull et al., "Noise2Void—Learning Denoising From Single Noisy Images," Institute of Electrical and Electronics Engineers (IEEE) Xplore, (Jan. 9, 2020), pp. 2129-2137. (Originally presented at 2019 IEEE/CVF Conference on Computer Vision and Pattern Recognition (CVPR), Jun. 16-20, 2019, Long Beach, CA).

Lehtinen et al., "Noise2Noise: Learning Image Restoration without Clean Data," arXiv:1803.04189v1 [cs.CV], (Mar. 12, 2018), 12 pages.

Mao et al., "Image Restoration Using Very Deep Convolutional Encoder-Decoder Networks with Symmetric Skip Connections," Association of Computing Machinery (ACM), (Dec. 5, 2016), pp. 2810-2818. (Originally presented at NIPS'16: 30th International Conference on Neural Information Processing Systems, Dec. 5-10, 2016, Barcelona, Spain).

Souibgui et al., "DE-GAN: A Conditional Generative Adversarial Network for Document Enhancement," Institute of Electrical and Electronics Engineers (IEEE) Transactions on Pattern Analysis and Machine Intelligence, (Epub Sep. 7, 2020; published Mar. 2022), 44(3):1180-1191.

Wang et al., "Deep Mixture of Experts via Shallow Embedding," Proceedings of Machine Learning Research (PMLR), In Proceedings of The 35th Uncertainty in Artificial Intelligence Conference, (Aug. 6, 2020), 115:552-562.

Zhang et al., "Beyond a Gaussian Denoiser: Residual Learning of Deep CNN for Image Denoising," Institute of Electrical and Electronics Engineers (IEEE) Transactions on Image Processing, (Epub Feb. 1, 2017; published Jul. 2017), 26(7):3142-3155.

* cited by examiner

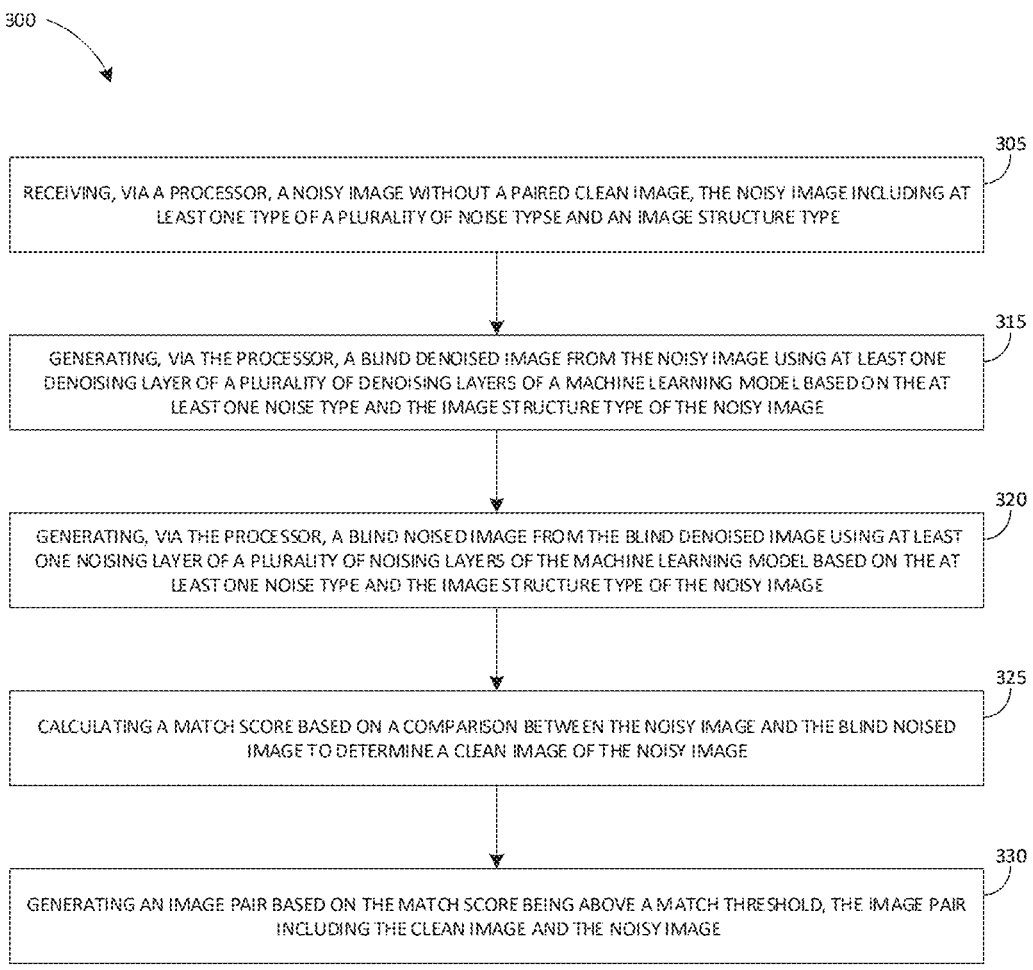

300

305

RECEIVING, VIA A PROCESSOR, A NOISY IMAGE WITHOUT A PAIRED CLEAN IMAGE, THE NOISY IMAGE INCLUDING AT LEAST ONE TYPE OF A PLURALITY OF NOISE TYPSE AND AN IMAGE STRUCTURE TYPE

315

GENERATING, VIA THE PROCESSOR, A BLIND DENOISED IMAGE FROM THE NOISY IMAGE USING AT LEAST ONE DENOISING LAYER OF A PLURALITY OF DENOISING LAYERS OF A MACHINE LEARNING MODEL BASED ON THE AT LEAST ONE NOISE TYPE AND THE IMAGE STRUCTURE TYPE OF THE NOISY IMAGE

320

GENERATING, VIA THE PROCESSOR, A BLIND NOISED IMAGE FROM THE BLIND DENOISED IMAGE USING AT LEAST ONE NOISING LAYER OF A PLURALITY OF NOISING LAYERS OF THE MACHINE LEARNING MODEL BASED ON THE AT LEAST ONE NOISE TYPE AND THE IMAGE STRUCTURE TYPE OF THE NOISY IMAGE

325

CALCULATING A MATCH SCORE BASED ON A COMPARISON BETWEEN THE NOISY IMAGE AND THE BLIND NOISED IMAGE TO DETERMINE A CLEAN IMAGE OF THE NOISY IMAGE

330

GENERATING AN IMAGE PAIR BASED ON THE MATCH SCORE BEING ABOVE A MATCH THRESHOLD, THE IMAGE PAIR INCLUDING THE CLEAN IMAGE AND THE NOISY IMAGE

FIG. 3

| Document type | Lease Contracts | | | K1 | Invoices |
|---|---|---|---|---|---|
| Noise types | Salt & Pepper | Blurred | Faded | Watermarked | Watermarked |
| No. of noisy/clean pages | 663/1125 | 1513/1125 | 377/1125 | 5416/5418 | 1339/1339 |
| Page size | Resized to Closest Multiple of Patch Size | | | | |
| Patch size | 256 x 256 | | | | |
| Total no. of noisy patches | 290,119 | 578,316 | 137,181 | 2,212,729 | 542,121 |
| Total no. of clean patches | 440,159 | | | | |
| Data augmentation | Overlapping with the Stride of 128 pixels | | | | |

FIG. 4A

| Datasets | Dataset I | Dataset II | Dataset III | | | | |
|---|---|---|---|---|---|---|---|
| | Scientific Papers | Tobacco800 | Lease Contracts | | | Tax Forms | Invoices |
| Noise Types | Watermark | Various | S&P | Blurred | Faded | Watermark | Watermark |
| No. of Pages | 100 | 100 | 80 | 100 | 80 | 40 | 40 |

FIG. 4B

ORIGINAL   CLEANED

ORIGINAL   CLEANED

ORIGINAL   CLEANED

ORIGINAL   CLEANED

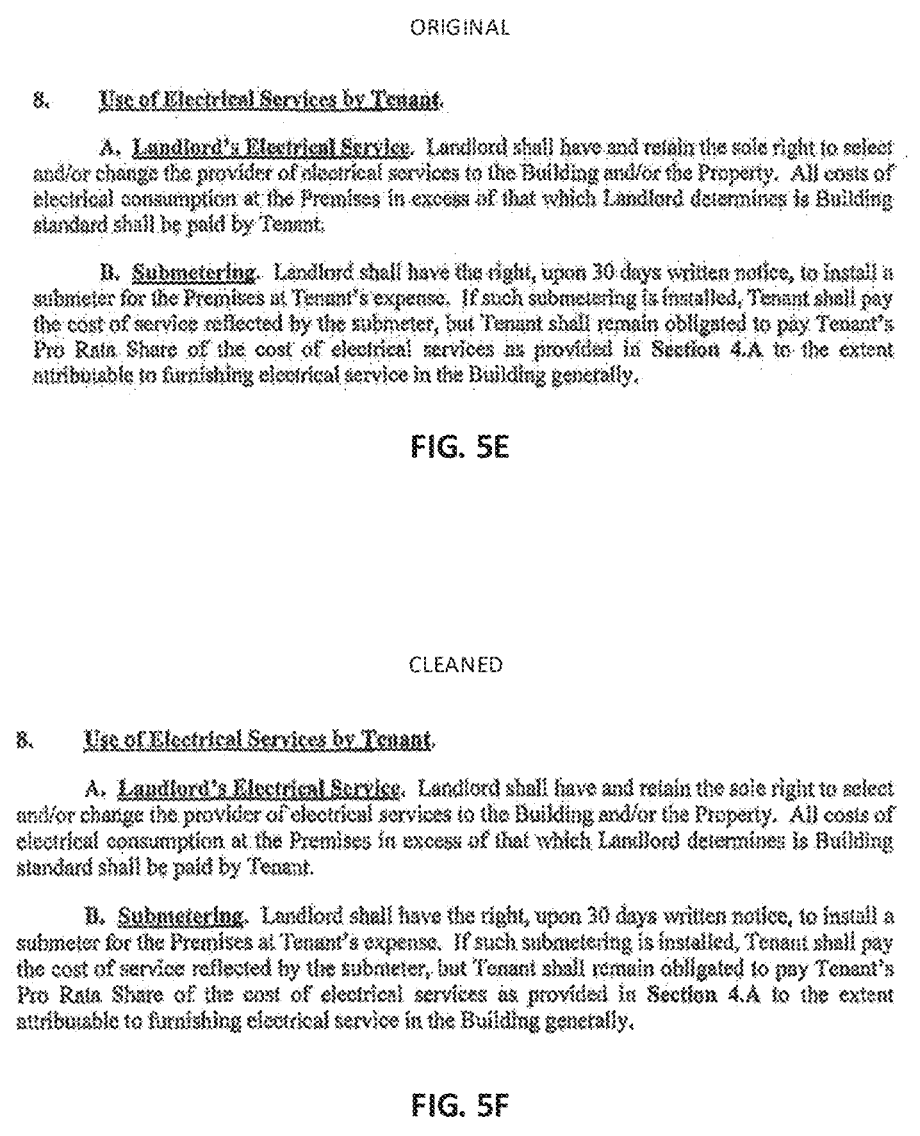

ORIGINAL

8.    Use of Electrical Services by Tenant.

A. Landlord's Electrical Service. Landlord shall have and retain the sole right to select and/or change the provider of electrical services to the Building and/or the Property. All costs of electrical consumption at the Premises in excess of that which Landlord determines is Building standard shall be paid by Tenant.

B. Submetering. Landlord shall have the right, upon 30 days written notice, to install a submeter for the Premises at Tenant's expense. If such submetering is installed, Tenant shall pay the cost of service reflected by the submeter, but Tenant shall remain obligated to pay Tenant's Pro Rata Share of the cost of electrical services as provided in Section 4.A to the extent attributable to furnishing electrical service in the Building generally.

FIG. 5E

CLEANED

8.    Use of Electrical Services by Tenant.

A. Landlord's Electrical Service. Landlord shall have and retain the sole right to select and/or change the provider of electrical services to the Building and/or the Property. All costs of electrical consumption at the Premises in excess of that which Landlord determines is Building standard shall be paid by Tenant.

B. Submetering. Landlord shall have the right, upon 30 days written notice, to install a submeter for the Premises at Tenant's expense. If such submetering is installed, Tenant shall pay the cost of service reflected by the submeter, but Tenant shall remain obligated to pay Tenant's Pro Rata Share of the cost of electrical services as provided in Section 4.A to the extent attributable to furnishing electrical service in the Building generally.

FIG. 5F

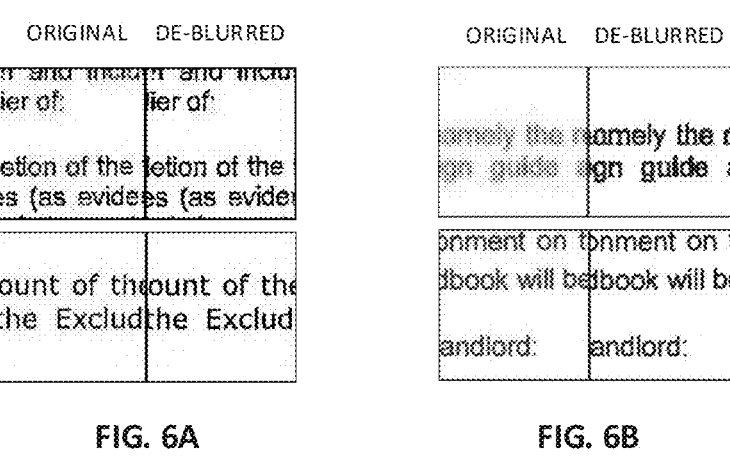
FIG. 6A                    FIG. 6B
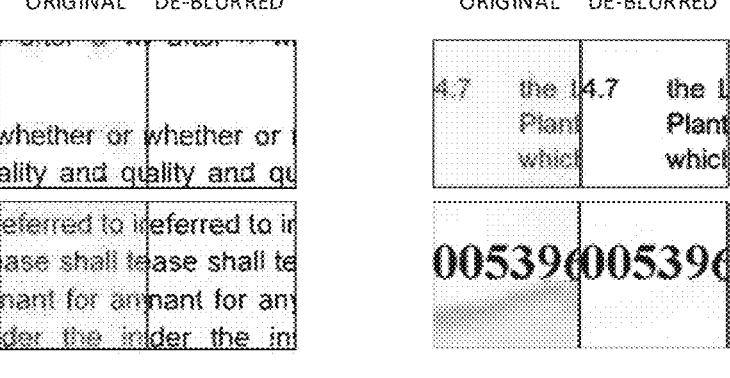
FIG. 6C                    FIG. 6D

ORIGINAL 2.2.2   the Rack Rental Value determined by Arbitration on the application of the Landlord or the Tenant made at any time after the Review Date 3.   Memorandum 3.1   Whenever a new Rent is agreed under paragraph 2.1 of this Schedule the Landlord and the Tenant shall sign a memorandum in duplicate recording the agreed amount of the new Rent and the memoranda shall be exchanged 3.2   The memoranda shall be prepared by the Landlord and the cost shall be borne by the Tenant 4.   Late review

FIG. 6E

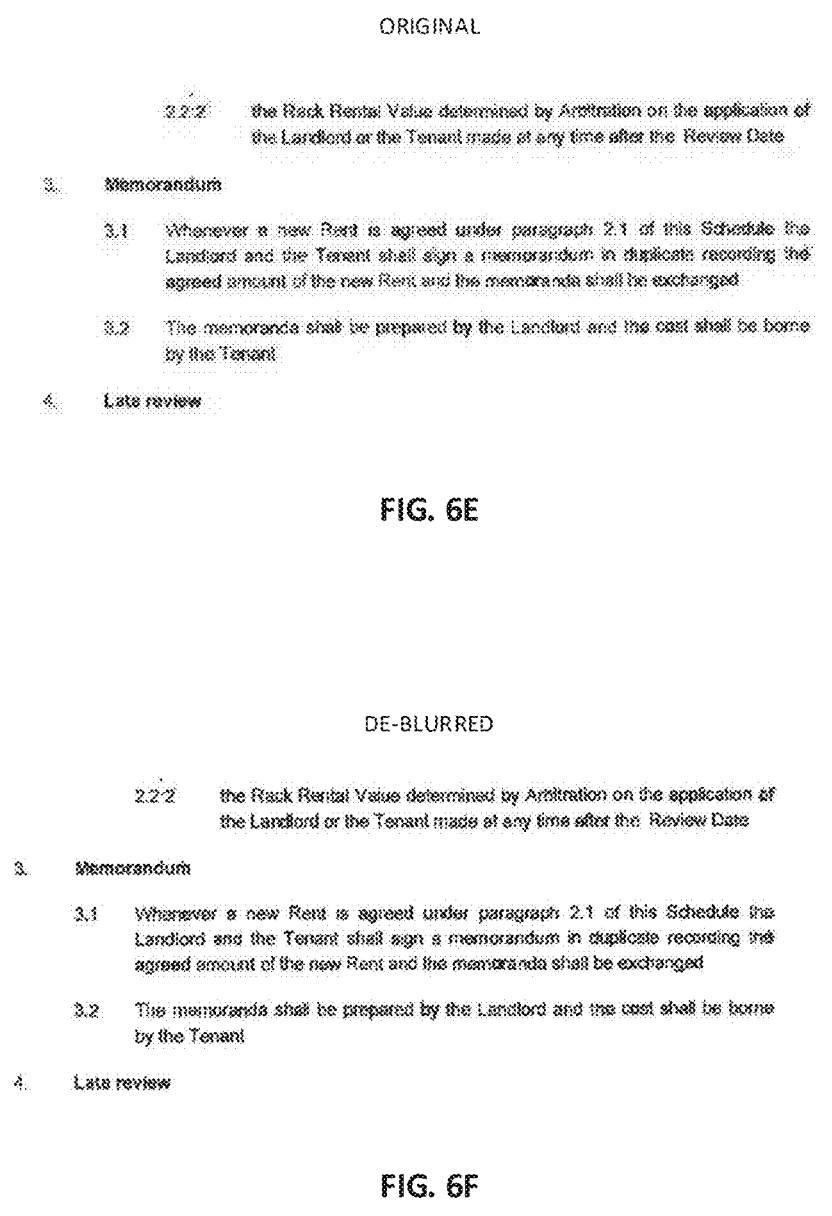

DE-BLURRED 2.2.2   the Rack Rental Value determined by Arbitration on the application of the Landlord or the Tenant made at any time after the Review Date 3.   Memorandum 3.1   Whenever a new Rent is agreed under paragraph 2.1 of this Schedule the Landlord and the Tenant shall sign a memorandum in duplicate recording the agreed amount of the new Rent and the memoranda shall be exchanged 3.2   The memoranda shall be prepared by the Landlord and the cost shall be borne by the Tenant 4.   Late review

FIG. 6F

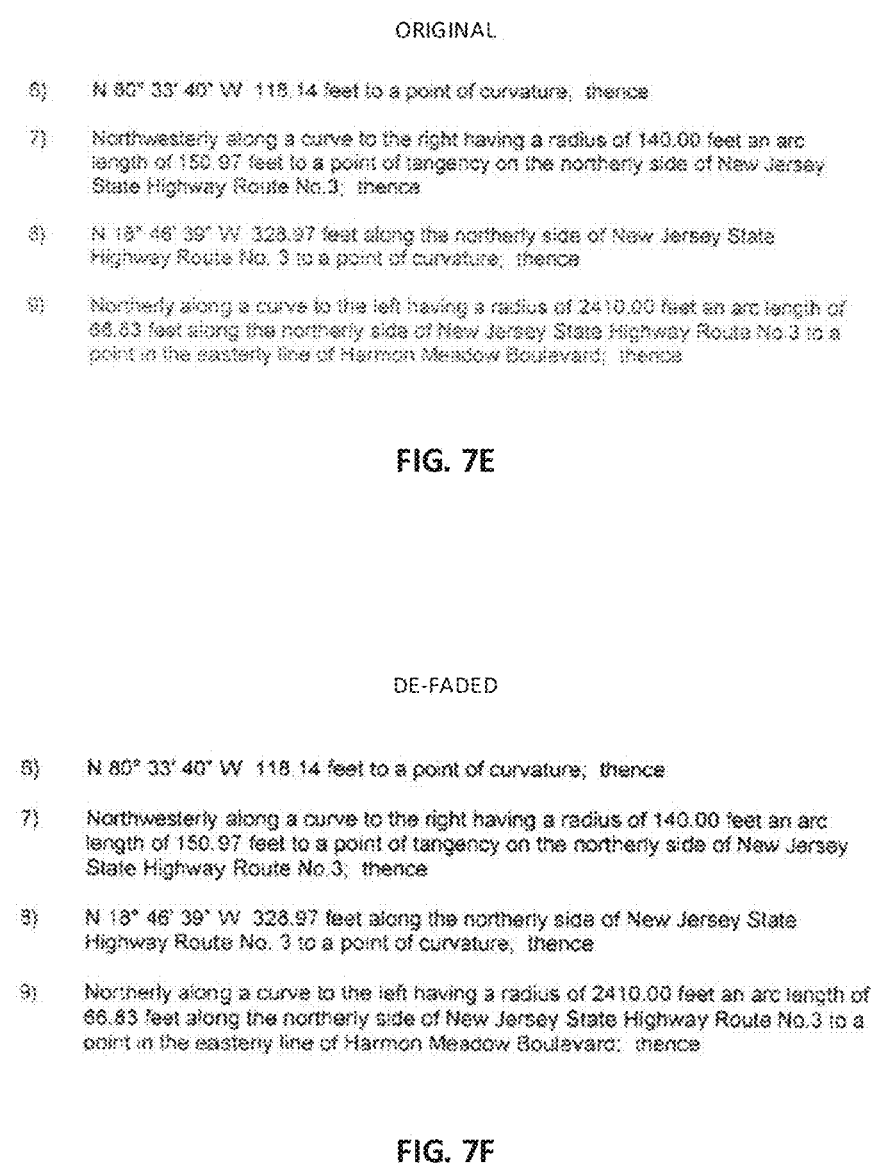

ORIGINAL

6)    N 80° 33' 40" W  118.14 feet to a point of curvature;  thence

7)    Northwesterly along a curve to the right having a radius of 140.00 feet an arc
      length of 150.97 feet to a point of tangency on the northerly side of New Jersey
      State Highway Route No.3;  thence 8)    N 18° 46' 39" W  328.97 feet along the northerly side of New Jersey State
      Highway Route No. 3 to a point of curvature;  thence 9)    Northerly along a curve to the left having a radius of 2410.00 feet an arc length of
      66.83 feet along the northerly side of New Jersey State Highway Route No.3 to a
      point in the easterly line of Harmon Meadow Boulevard;  thence

FIG. 7E

DE-FADED

6)    N 80° 33' 40" W  118.14 feet to a point of curvature;  thence

7)    Northwesterly along a curve to the right having a radius of 140.00 feet an arc
      length of 150.97 feet to a point of tangency on the northerly side of New Jersey
      State Highway Route No.3;  thence 8)    N 18° 46' 39" W  328.97 feet along the northerly side of New Jersey State
      Highway Route No. 3 to a point of curvature;  thence 9)    Northerly along a curve to the left having a radius of 2410.00 feet an arc length of
      66.83 feet along the northerly side of New Jersey State Highway Route No.3 to a
      point in the easterly line of Harmon Meadow Boulevard;  thence

FIG. 7F

WATERMARKED

FIG. 8A

CLEANED

FIG. 8B

METHODS AND APPARATUS FOR END-TO-END UNSUPERVISED MULTI-DOCUMENT BLIND IMAGE DENOISING

CROSS-REFERENCE TO RELATED APPLICATIONS

This application is a continuation of U.S. patent application Ser. No. 19/204,321, titled "METHODS AND APPARATUS FOR END-TO-END UNSUPERVISED MULTI-DOCUMENT BLIND IMAGE DENOISING", now U.S. Pat. No. 12,555,204, and filed May 9, 2025, which is a continuation of U.S. patent application Ser. No. 17/962,853, titled "METHODS AND APPARATUS FOR END-TO-END UNSUPERVISED MULTI-DOCUMENT BLIND IMAGE DENOISING," now U.S. Pat. No. 12,333,689, and filed Oct. 10, 2022, the disclosure of which is incorporated herein by reference.

FIELD

The present disclosure generally relates to the field of image processing involving computer vision. In particular, the present disclosure is directed to methods and apparatus for end-to-end unsupervised multi-document blind image denoising.

BACKGROUND

A large percentage of scanned documents and images contain one or more various types of noise, including for example salt & pepper noise, blurred or faded text, watermarks, etc. Such "noise" in documents highly degrade the performance of optical character recognition (OCR) technologies, successive digitization, and analysis of documents and images. Removing noise from scanned pages is desirable. Known image denoising methods, however, typically use supervised techniques where pairs of noisy/clean images are required, but rarely available.

SUMMARY

In an embodiment, an apparatus for end-to-end unsupervised multi-document blind image denoising is presented. The apparatus includes a processor and a memory operatively coupled to the processor. The memory stores instructions to cause the processor to receive a noisy image without a paired clean image, where the noisy image including at least one noise type of a plurality of noise types. The memory further stores instructions to cause the processor to generate a blind denoised image from the noisy image using at least one denoising layer of a plurality of denoising layers of an end-to-end machine learning model based on the at least one noise type and then generate a blind noised image from the blind denoised image using at least one noising layer of a plurality of noising layers of the end-to-end machine learning model. The memory stores instructions to further cause the processor to calculate a match score based on a comparison between the noisy image and the blind noised image. The memory stores instructions to then cause the processor to generate a clean image based on the match score and a match threshold.

BRIEF DESCRIPTION OF THE DRAWINGS

FIG. 3 is a flowchart of a method for end-to-end unsupervised multi-document blind image denoising, according to an embodiment.

FIG. 4A is a table of a training dataset for a system for a blind image denoiser, according to an embodiment.

FIG. 4B is a table of testing datasets for a system for a blind image denoiser, according to an embodiment.

FIGS. 5A-F are various image pairs of noisy documents with salt & pepper noise and cleaned documents, according to an embodiment.

FIGS. 6A-F are various image pairs of noisy documents with blur and de-blurred documents, according to an embodiment.

FIGS. 7A-F are various image pairs of noisy documents with fade and de-faded documents, according to an embodiment.

FIGS. 8A-B are an image pair of a noisy document with watermark and a cleaned document, according to an embodiment.

DETAILED DESCRIPTION

Figure 1:
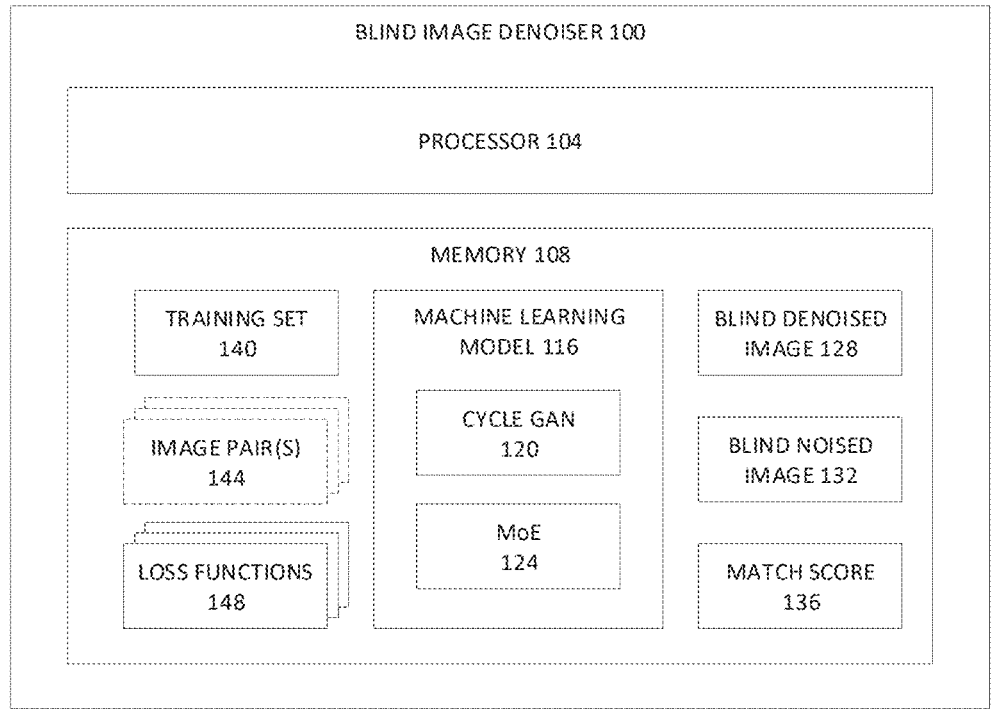
FIG. 1 is a diagrammatic representation of a system for a blind image denoiser using end-to-end unsupervised multi-document blind image denoising, according to an embodiment.

One or more embodiments of the present disclosure can be used to scan multiple physical documents, images, and/or images of the physical documents, containing various types of noise, including salt & pepper (S&P) noise, blurred or faded text, shadings, watermarks, or the like, and improve the quality of the electronic documents using image processing techniques, image denoising, and image restoration, without the requirement of noisy/clean pairs. As used in this disclosure, a document can also be referred to as an "image", "scanned document," or "electronic document." The document or the image as described herein can also refer to a digital version and/or copy of a physical document. A "noisy" document and/or image can include an electronic document including any noise that impedes readability of the electronic document including salt & pepper (S&P) noise, blurred or faded text, shadings, watermarks, or the like. A "clean" or "cleaned" document can refer to a corresponding electronic document, such as a noisy document, removed of the noise (to at least an extent). For example, a noisy document can contain watermarks, S&P noise, and blurry text, where a corresponding clean document contains only a de-blurred text of the blurry text found in the noisy document.

One or more embodiments of the present disclosure includes an end-to-end unsupervised image blind denoising model that presents a single unified model to remove the various noise types. The single unified model integrates a deep Mixture of Experts (MoE) with a cycle-consistent Generative Adversarial Network (CycleGAN) based on various loss functions (or objective/optimization functions) to evaluate and improve the single unified model. The end-to-end unsupervised image blind denoising model removes the various noise types found in electronic documents at various intensity levels. The end-to-end unsupervised image blind denoising algorithm is also trained with noisy documents without noisy/clean pairs. The noisy documents used to train the end-to-end unsupervised image blind denoising model do not include synthetically added noise. The end-to-end unsupervised image blind denoising model can also classify and/or categorize electronic documents based on their structures to clean documents in various industries. The end-to-end unsupervised image blind denoising model can also work seamlessly across various structure types (e.g. structured, semi-structured, unstructured, etc.) of the documents. For instance, training the end-to-end unsupervised image blind denoising model does not use pairs of noisy/clean images, but includes generating subsets based on structure type of the documents, where the subsets include pairing generated cleaned documents with their initial noisy documents of the same structure, to minimize distorting the contents of documents when denoising. Alternatively or additionally, the end-to-end unsupervised image blind denoising model can generate its own noisy/image pairs from the clean images the end-to-end unsupervised image blind denoising model generates, where the new noisy/image pairs can be used to train a supervised image blind denoising model.

In some embodiments, training of the end-to-end unsupervised image blind denoising model involves training a single unified model as opposed to training a model for each noise type. For instance, cascaded individual models can result in degradation of an input image as each input image passes through the multiple models for each noise type, resulting in high latency based on the number of models. Here, training the end-to-end unsupervised image blind denoising model also integrates the CylceGAN with the MoE, where the end-to-end unsupervised image blind denoising model includes single unified model and multiple "experts" to remove various noise types effectively without significantly degrading the image.

FIG. 1 is a diagrammatic representation of a blind image denoiser 100 for end-to-end unsupervised multi-document blind image denoising, according to an embodiment. End-to-end unsupervised multi-document blind image denoising can refer to denoising multiple documents including various structure types and noise types to cleaned documents without noisy/clean pairs, noise-to-noise (N2N), noise-to-void (N2V), and/or noise-to-self (N2S) training strategies to generate the cleaned documents. The blind image denoiser 100 can include, for example, any compute device used to generate blind denoised images using an end-to-end unsupervised machine learning model. The blind image denoiser 100 includes a processor 104 and a memory 108. In some implementations, the blind image denoiser 100 can also include any processor-readable medium storing instructions for the processor 104 such as memory 108. The processor 104 and the memory 108 can communicate with each other, and with other components, via a bus (not shown). The bus can include, for example, any of several types of bus structures including, a memory bus, a memory controller, a peripheral bus, a local bus, and any combinations thereof, using any of a variety of bus architectures. The blind image denoiser 100 can include, for example, a computer workstation, a terminal computer, a server computer, a handheld device (e.g., a tablet computer, a smartphone, etc.), a web appliance, any machine capable of executing a sequence of instructions that specify an action to be taken by that machine, and/or any combinations thereof.

In some implementations, the blind image denoiser 100 can include a network interface (not shown). The network interface can be used for connecting the blind image denoiser 100 to one or more of a variety of networks (not shown) and one or more remote devices connected thereto. The network interface can include, for example, a network interface card (e.g., a mobile network interface card, a LAN card), a modem, and any combination thereof. The network can include, for example, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and/or the like. The blind image denoiser 100 can employ a wired and/or a wireless mode of communication.

The processor 104 can include, for example, a hardware based integrated circuit (IC), or any other suitable processing device configured to run and/or execute a set of instructions or code. For example, the processor 104 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 104 can be configured to run any of the methods and/or portions of methods discussed herein.

The memory 108 can be or include, for example, a random-access memory (RAM), a memory buffer, a hard drive, a read-only memory (ROM), an erasable programmable read-only memory (EPROM), and/or the like. In some instances, the memory 108 can store, for example, one or more software programs and/or code that can include instructions to cause the processor 104 to perform one or more processes, functions, and/or the like. In some implementations, the memory 108 can include extendable storage units that can be added and used incrementally. In some implementations, the memory 108 can be a portable memory (e.g., a flash drive, a portable hard disk, and/or the like) that can be operatively coupled to the processor 104. In some instances, the memory 108 can be remotely operatively coupled, for example, a remote database device can serve as a memory and be operatively coupled to the compute device. The memory 108 can include various components (e.g., machine-readable media) such as, for example, a random-access memory component, a read only component, and/or any combinations thereof. In some cases, a basic input/output system (BIOS), including basic routines that help to transfer information between elements within the blind image denoiser 100 such as during start-up, can be stored in memory 108. The memory 108 can also include any number of program modules including, for example, an operating system, one or more application programs, other program modules, program data, and/or any combinations thereof.

The memory 108 stores instructions to cause the processor 104 to receive a noisy image that includes at least one noise type of multiple noise types. The noisy image includes any electronic document containing noise and/or text. The noisy image can include, for example, lease documents, invoices, K1 forms, contracts, forms, emails, or the like. The blind image denoiser 100 receives, via the processor 104, the noisy image, which is not paired and/or correlated with a pre-exiting clean image (e.g., a clean and/or cleaned up version of the noisy document without any noise found in the noisy document to at least an extent). The pre-existing clean image can also be referred to as a "pre-existing cleaned image." The memory 108 also does not store a collection of pre-existing clean images and/or unpaired pre-existing images. This is so, at least in part, to reduce a requirement of a pre-existing clean image (e.g., the clean image) for the noisy image to enable the blind image denoiser 100 to denoise the noisy image. The various noise types can include, for example, salt & pepper (S&P) noise, blurred or faded text, shadings, watermarks, or the like. As used in this disclosure, "denoise" or "denoised" can also be referred as "clean" or "cleaned," respectively.

The memory 108 of the blind image denoiser 100 stores instructions to cause the processor 104 to generate a blind denoised image 128 from the noisy image using at least one denoising layer of multiple denoising layers. The blind denoised image 128 can be a blindly denoised and/or blindly cleaned image of the noisy image, where the blind image denoiser 100 removes the at least one noise type found in the noisy image. For instance, the blind image denoiser 100 can receive an image of a document such as an invoice, where the image contains blurry text, watermarks, and S&P noise. The blind image denoiser 100 then can clean the blurry text, watermarks, and S&P noise, resulting in a predicted cleaned invoice of the noisy image to generate a blind denoised image 128.

The memory 108 of the blind image denoiser 100 also stores instructions to cause the processor 104 to identify an image structure type of the noisy image and/or any image. The image structure type can include, for example, structured, semi-structured, unstructured, or the like. In some cases, a document and/or image can be associated with different noise types based on the image structure type of the document and/or image. For instance, unstructured types can include lease documents, where lease documents often have S&P, faded text, and/or blurred text. In another example, semi-structure types can include invoices, where invoices often have watermarks, stamps, S&P, and/or blurred texts. In another example, structured types can include K1 tax forms, where these forms often have watermarks. The memory 108 of the blind image denoiser 100 can store instructions to cause the processor 104 to classify and/or categorize any documents and/or images based on the image structure type and store them in the memory 108 and/or any database (e.g., cloud-based database). In some implementations, the blind image denoiser 100 can be configured to optimally denoise the noisy image based on the image structure type of the noisy image.

The blind image denoiser 100 includes a machine learning model 116 that generates a cleaned image blindly without a pre-existing clean image. The machine learning model 116 can include, for example, an unsupervised machine learning model, an end-to-end machine learning model, a convolutional neural network (CNN), a single unified model, and/or the like. In some implementations, the machine learning model 116 includes a single machine learning model configured to detect various noise types to generate the blind denoised image 128. In some implementations, the blind image denoiser 100 includes the machine learning model 116 that further includes a cycle-consistent GAN, such as a CycleGAN 120, integrated with a Mixture of Experts (MoE) 124. The MoE 124 includes a deep MoE. In some instances, the machine learning model 116 can include and/or refer to the MoE 124. The architecture of the machine learning model 116 and/or the CycleGAN 120 integrated with the MoE 124 is further described in FIG. 2. In some implementations, training the machine learning model 116 can be done offline and/or without a connection to any network.

The CycleGAN 120 can include, for example, two GANs such as a denoising generator and a noising generator. The denoising generator can generate, based on the at least one noise type, the blind denoised image 128 of the noisy image while the noising generator can generate, based on the one at least one noise type of the noisy document, a blind noised image 132 from the blind denoised image 128. In some implementations, the memory 108 can store instructions to cause the processor 104 to compute a blind score for the blind denoised image 128 that describes the accuracy of the blind denoised image 128. The blind score can include, for example, a binary value, numerical range, or the like, that determines how likely the blind denoised image 128 is the same as the noisy image with the at least one noise removed. For instance, the blind score can include "real"/"fake", "yes"/"no", [0,1], [1,0], or the like. The blind score can also include a numerical range deterministic of the likelihood the blind denoised image 128 is a cleaned version of the noisy image. The blind score can also include a qualitative and/or quantitative value that checks if the generated blind denoised image 128 is "real" or "fake", e.g., that the blind denoised image 128 is correctly (to at least an extent) cleaned of noise of the noisy image or the preserved contents of the blind denoised image 128 are maintained. The blind score for the blind denoised image 128 can also include a value to indicate the classification of the blind denoised image 128, based on the image structure type, noise types, denoising intensity, and/or the like.

The MoE 124 can include an ensemble learning technique that implements the training of "experts" or "expert models" on subtasks to identify various noise types of documents processed by the blind image denoiser 100. The MoE 124 of the blind image denoiser 100 including the deep MoE includes multiple layers within a convolutional neural network. The memory 108 of the blind image denoiser 100 stores instructions to cause the processor 104 to generate the blind denoised image 128 from the noisy image using at least one denoising layer of multiple denoising layers (not shown) of the MoE 124. The denoising layers can include convolutional layers where each denoising layer is associated with a specific noise type and configured to clean/denoise that specific noise type from the received noisy image. Each denoising layer can extract the noise type associated with that denoising layer and transform input data (e.g., the noisy document) into an image removed (to at least an extent) of the noise type associated with that denoising layer. In some implementations, the transformation of the noisy image can be convolved with a kernel and/or filter that includes a small matrix having a height and width smaller than that of the noisy image.

The memory 108 of the blind image denoiser 100 stores instructions to cause the processor 104 to generate, via the machine learning model 116, the blind noised image 132 based on the at least one noise type of the noisy document. In some implementations, the blind noised image 132 can include an image with blindly (or synthetically) added noise using the blind denoised image 128 as a base, where the blind noised image 132 is intended to be identical and/or similar to the noisy image. The blind image denoiser 100 generates the blind noised image 132 using at least one noising layer of a multiple noising layers (not shown) of the MoE 124. As previously described, the CycleGAN 120 can include two GANs such as the denoising generator and the noising generator. The noising generator can generate, based on the one at least one noise type of the noisy image, a blind noised image 132 from the blind denoised image 128. The noising generator can include a noising discriminator (not shown) that calculates a blind score for the blind noised image 132.

The noising layers can include convolutional layers where each noising layer is associated with a specific noise type and configured to "noise" the blind denoised image 128 based on the noise type associated with each noising layer. "Noising" can refer to generating noise and/or adding noise on an input image. In some instance, the at least one denoising layer of the multiple denoising layers and the at least one noising layer of the multiple noising layers can both be associated with a common noise type, such as, for example, S&P, where the at least one denoising layer is configured to denoise and/or clean the noisy image, to generate the blind denoised image 128, and the at least one noising layer is configure to noise the blind denoised image 128 (by adding noise) to generate the blind noised image 132.

In some implementations, the CycleGAN 120 of the machine learning model 116 can include objective functions and/or loss function(s) 148 to increase and/or maximize the denoising of the noisy image and reduce and/or minimize the noising of the blind denoised image 128. The objective function can be based on, for example, a loss function of multiple loss functions 148 such as a cycle consistency loss ($L_{cyc}$) that transforms the noisy document and/or the blind denoised image 128 from one domain to another and a GAN loss ($L_{GAN}$) that preserves the contents of the noisy image and/or the blind denoised image 128. This is so, at least in part, to evaluate and improve the blind denoising for any noisy image and/or the noising of any denoised image to determine if the denoised image, such as the blind denoised image 128, preserves the contents (to at least an extent) of the noisy image. The loss functions 148 can be stored in code, text, and/or binary representations in the memory 108.

As previously mentioned, the CycleGAN 120 can include for example two GANs such as a denoising generator and a noising generator. The denoising generator can generate, based on the at least one noise type, the blind denoised image 128 of the noisy image while the noising generator can generate, based on the one at least one noise type of the noisy image, a blind noised image 132 from the blind denoised image 128. The denoising generator can include a denoising discriminator (not shown) that can calculate the blind score for the blind denoised image 128, where the score determines the accuracy and/or correctness of the denoising of the noisy image. The memory 108 of the blind image denoiser 100 stores instructions to cause the processor 104 to calculate a match score 136 based on a comparison between the noisy image and the blind noised image 132. In some implementations, the comparison between the noisy image and the blind noised image 132 can include, for example, calculating the match score 136 for the blind noised image 132. In some implementations, the match score 136 for the blind noised image 132 can be calculated similarly to the blind score for the blind denoised image 128. For instance, the match score 136 can include, for example, a binary value, numerical range, or the like, that determines how likely the blind denoised image 128 is the same as the noisy image with the at least one noise removed. For instance, the blind score can include "real"/"fake", "yes"/ "no", [0,1], [1,0], or the like. The blind score can also include a numerical range deterministic of the likelihood the blind denoised image 128 is a cleaned version of the noisy image. The match score 136 can also include a qualitative and/or quantitative value, indicator, and/or score that checks if the generated blind noised image 132 is "real" or "fake" when compared to the noisy image, e.g., that the blind noised image 132 is identical and/or similar (to at least an extent) to the noisy image. This is so, at least in part, to determine that the generated blind denoised image 128 is a "real" and/or "correct" cleaned image of the noisy image based on the added noise via the noising layers of the MoE 124 and/or the noising generator of the CycleGAN 120. Alternatively or additionally, the match score 136 can also indicate that the blind denoised image 128 is correctly reversed (processed) to generate a blind version of the noisy image, such as the blind noised image 132. The match score 136 for the blind noised image 132 can also include a value to indicate the classification of the blind noised image 132, based on the image structure type, noise types, denoising intensity, and/or the like, where the classification is identical and/or similar to the classification of the blind denoised image 128.

Alternatively or additionally, the memory 108 of the blind image denoiser 100 can cause the processor 104 to calculate the match score 136 by comparing the blind score of the blind denoised image 128 and a second blind score of the blind noised image 132. In some instances, the blind score of the blind denoised image 128 can be identical to the second blind score of the blind noised image 132. For example, the blind image denoiser 100 can calculate the blind score for the blind denoised image 128, where the blind score is based on only the noisy document and/or the loss functions 148 (e.g., cycle consistency loss) and without a paired target clean score and/or pre-existing clean image. The blind image denoiser 100 can also calculate the second blind score of the blind noised image 132 in a similar fashion in generating the blind score of the blind denoised image 128. The blind image denoiser 100 can calculate the match score 136 by checking how accurately the blind image denoiser 100 blindly denoises the noisy image to generate the blind denoised image 128 and how accurately the blind image denoiser 100 blindly noises the blind denoised image 128 to generate the blind noised image 132.

The memory 108 of the blind image denoiser 100 can generate a clean image based on the match score 136 and a match threshold. The clean image can be a confirmed image that the blind denoised image 128 is the sufficiently clean version of the noisy image. As such, the clean image can be identical to the blind denoised image 128. The match threshold can include, for example, an amount, level, or limit indicating an accuracy of a comparison between two images (i.e., the noisy image and the blind noised image 136 generated from the blind denoised image 128), that when reached, the blind image denoiser 100 confirms that the blind denoised image 128 is (to at least an extent) the clean and/or cleaned image of the noisy image, based on the match threshold. For example, the noisy image can include a contract agreement with various texts and numbers as well as various noises such as S&P, blurry text, and/or water-marks. The clean image can preserve the various texts and numbers while removing (to at least an extent) the various noises including S&P, blurry text, and/or watermarks. In some implementations, the match threshold can be modified to adjust the acceptability of the blind noised image 132. In some cases, the blind noised image 132 is not a perfect match with the noisy image. In some instances, blind noised image 132 despite not being a perfect match may be deter-mined to be a sufficient enough of a match for the blind noised image 132 to be labeled as the clean image for the noisy image.

In some implementations, the denoising discriminator and the noising discriminator aim to differentiate between the two outputs of the denoising generator (e.g., blind denoised image 128) and the noising generator (e.g., blind noised image 132) and real data (e.g. the noisy document). The denoising generator aims to transform the noisy image from a denoising domain to a noising domain. For instance, the denoising discriminator of the CycleGAN 120 aims to discriminate between the generated blind denoised image 128 and the clean image. The denoising discriminator can calculate the blind score 136 for the blind denoised image 128 based on the blind denoised image 128 and the clean image. In the noising domain, the noising discriminator aims to distinguish between the generated blind denoised image 132 and the noisy image. The CycleGAN 120 can incorporate the objective function, which can be based on the loss functions 148 including, for example, the cycle consistency loss ($L_{cyc}$) that preserves the contents of the noisy image when generating the blind denoised image 128 and/or that preserves the contents of the blind denoised image 128 when generating the blind noised image 132 and a GAN loss ($L_{GAN}$) that. transforms the noisy image and/or the blind denoised image 128 from one domain to another.

In some implementations, the machine learning model 116 can refer to the MoE 124, where the machine learning model 116 can also be referred as the "base model." For instance the MoE 124 architecture of the blind image denoiser 100 extends a single-layer MoE model to multiple layers, including the denoising layers and the noising layers, within a single convolutional neural network. The MoE 124 can include three components, such as a base convolutional neural network (not shown), a shallow embedding network (not shown), and a multi-headed sparse gating network (not shown). In some implementations, the base convolutional network includes a deep network where each convolution layer is replaced with an MoE convolution layer (e.g., the at least one denoising layer and the at least one noising layer). In some implementations, the shallow embedding network of the MoE 124 can map the noisy image into a mixture of weights to be fed into the multi-headed sparse gating network of the MoE 124. For instance, to reduce computational overhead of the shallow embedding network of the MoE 124, the blind image denoiser 100 can incorporate a 4-layer or 5-layer convolutional network with 3×3 filters with roughly 2% of the computation of the machine learning model 116 (e.g., the base model) of the MoE 124. The multi-headed sparse gating network, or "gating network," selects the combination of "experts" to use in denoising the noisy image and/or noising the generated blind denoised image 128 based on the at least one noise type of the noisy image. In some instances, the MoE 124 can be used to interpret the predictions made by each expert and decide which expert to trust, use, and/or activate for a given input (e.g., the noisy image for generating the blind denoised image 128 or the blind denoised image 128 for generating the blind noised image 132). The experts can also refer to networks and/or learners used to divide the various noise types into homogenous regions to denoise the noisy image based on each noise type for the denoising domain and/or noising the blind denoised image 128 based on each noise type for the noising domain. The gating model can receive, as an input, some patterns and/or characteristics found in various noise types provided to the experts and output a contribution that each expert should be involved in making a prediction (e.g., the blind denoised image 128 and/or the blind noised image 132) for the input.

The multiple layers, such as the denoising layers and the noising layers, can include multiple channels, such as denoising channels and noising channels, where the gating network of the MoE 124 treats each channel as an expert. The gating network can also include multiple gates such as denoising gates, where each denoising gate of the multiple denoising gates is configured to trust, use and/or activate at least one denoising channel of the multiple denoising channels of each denoising layer of the multiple denoising layers. The gating network also includes multiple noising gates, where each noising gate of the multiple noising gates is configured to trust, use and/or activate at least one noising channel of the multiple noising channels of each noising layer of the multiple noising layers. As previously mentioned, in some implementations, the blind image denoiser 100 can construct the MoE 124 with the denoising layers and the noising layers based on an embedder, where the embedder can include, for example, a shallow embedder, a shared shallow embedder, a convolutional embedder, or the like. The memory 108 of the blind image denoiser 100 stores instructions to cause the processor 104 to compute, via the embedder, a denoising mixture weight of multiple denoising mixture weights for each denoising gate based on the noisy image in the denoising domain. In the noising domain, the memory 108 stores instructions to cause the processor 104 to compute, via the embedder, a noising mixture weight of multiple noising mixture weights for each noising gate of based on the blind denoised image 128. In some instances, the gating network can be responsible for transforming latent mixture weights (e.g., denoising mixture weights and noising mixture weights) produced by the embedder into sparse mixture weights for the denoising layers and noising layers of the CycleGAN 120 and/or the MoE 124. In some implementations, the computed mixture weights (e.g., the denoising mixture weights and the noising mixture weights) can include a numerical value within a numerical range, where a higher number indicates a greater weight and a lower value indicates a lower weight.

In some implementations, the multi-headed sparse gating network can include two gating networks such as, for example, a denoising gating network and a noising gating network. The denoising gating network can also include the multiple denoising gates for each noise type configured to select the denoising channels (i.e., experts) to use in denoising the noisy image for each noise type (to some extent and/or various levels of intensity). The denoising gating network can take, as an input, a noise pattern based on the denoising mixture weights computed by the embedder and output a selection of which denoising channel to use for each denoising layer, in generating the blind denoised image 128. For the noising domain, the noising gating network can also include the multiple noising gates for each noise type configured to select the noising channels (i.e., experts) to use in noising the blind denoised image 128 for each noise type (to some extent and/or various levels of intensity). The noising gating network can take, as an input, a noise pattern based on the noising mixture weights computed by the embedder and output a selection of which noising channel to use for each nosing layer, in generating the blind noised image 132, where the blind image denoiser 100 can compare the results to verify the accuracy of the blind denoised image 128.

In some implementations, as with standard convolutional neural networks, the MoE 124 can be trained end-to-end using gradient-based methods. The MoE 124 can be configured to achieve high prediction accuracy in using correct denoising/noising gates for denoising/noising channels, lower computation overhead, and keep the MoE 124 highly expressive. As such, the MoE 124 can be trained to learn a gating policy that selects a diverse, low-cost mixture of experts (e.g., denoising/noising channels). For instance, the memory 108 of the blind image denoiser 100 can include instructions to cause the processor 104 to generate an image pair of multiple image pairs 144 based on the match score 136. The image pair can include the clean image (or the blind denoised image 128) and the noisy image having at least one noise type. The memory 108 can store instructions to cause the processor 104 to train the embedder of the MoE 124 based on the image pair, to produce a trained MoE 124 including trained gating network that includes trained denoising gates and trained noising gates. The trained gating network can be configured to identify specific patterns for each noise type when denoising and/or noising an input image. In some implementations, the training of the MoE 124 can produce a trained embedder and/or trained experts (e.g., trained denoising channels and/or trained noising channels).

The MoE 124 incorporates multiple loss functions 148 such as, for example, an optimization function based on minimizing three losses including (1) the loss for the base convolutional neural network (e.g. cross-entropy loss), (2) a cross-entropy loss for the shallow embedding network, and (3) and a loss function for the gated network(s).

The memory 108 of the blind image denoiser 100 can include instructions to cause the processor 104 to train the machine learning model 116 using a training set 140. The training set 140 can also be referred to as a "training dataset." The training set 140 includes unlabeled data. For instance, a document/image can be characterized by the image structure type: unstructured (e.g., lease contracts and scientific papers), semi-structured (e.g., invoices), and structured (e.g., tax forms). The training set 140 can be categorized and/or classified by their image structure type but remain unlabeled (i.e., without a paired pre-existing clean image). The training set 140 can be further described in connection with the example of FIG. 4A. The memory 108 of the blind image denoiser 100 can also include instructions to cause the processor 104 to test the machine learning model 116 using testing datasets including clean and high quality images, images with added noise, and/or images containing various noise types. The testing dataset can be further described in connection with the example of FIG. 4B. In other words, the machine learning model 116, including the end-to-end unsupervised machine learning model, is trained without the requirement to have pre-existing clean and/or cleaned images, which may not be readily available, and trained with the training set 140 including multiple noisy images that do not include synthetically added noise.

In some implementations, the machine learning model 116 can include a supervised machine learning model. The blind image denoiser 100 can form image pairs 144 of noisy/clean images with the generated blind denoised image 128 and/or the confirmed clean image of the blind denoised image 128 based on the match score 136 being above the match threshold. The generated image pairs 144 can include an image pair having the noisy image having the at least one noise type paired with the generated blind denoised image 128 and/or the clean image. For instance, the noisy image can be referred to as a first noisy image, the clean image can be referred to as a first clean image, and the match score can be referred to as a first match score. In some implementations, the blind image denoiser 100 can include the supervised machine learning model different from the machine learning 116, which can include the unsupervised machine learning model. In some cases, the blind image denoiser 100 can denoise various noisy documents in a supervised setting using image pairs 144 formed with the blindly generated cleaned documents from the unsupervised machine learning model of the machine learning model 116. The memory 108 of the blind image denoiser 100 can store instructions to cause the processor 104 to generate a first image pair based on the first match score, where the first image pair includes the first noisy image and the clean image based on the match score. The blind image denoiser 100 can receive a second noisy image where the second noisy image includes at least one noise type. The memory 108 can store instructions to cause the processor 104 to train the supervised machine learning model based on the first image pair, to produce a trained supervised machine learning model (or "trained model"). As the supervised machine learning model is trained and the trained supervised machine learning model is repeatedly trained, the memory 108 can store instructions to cause the processor 104 to execute the trained supervised machine learning model to generate and/or predict a second clean image. In some implementations, the memory 108 stores instructions to cause the processor 104 to repeatedly train and/or execute the trained model using multiple image pairs to generate multiple match scores and image pairs. In some implementations, the memory 108 stores instructions to cause the processor 104 to train and/or execute the trained model simultaneously based on the multiple noisy images.

The supervised machine learning model can be trained with the training set 140 that can include labeled data (e.g., paired pre-existing clean images). For instance, the blind image denoiser 100 can form the image pairs 144 and use the image pairs 144 as the training set 140 to train the supervised machine learning model. The memory 108 of the blind image denoiser 100 can store instructions to cause the processor 104 to perform the processes and steps in denoising a noisy image automatically.

Figure 2:
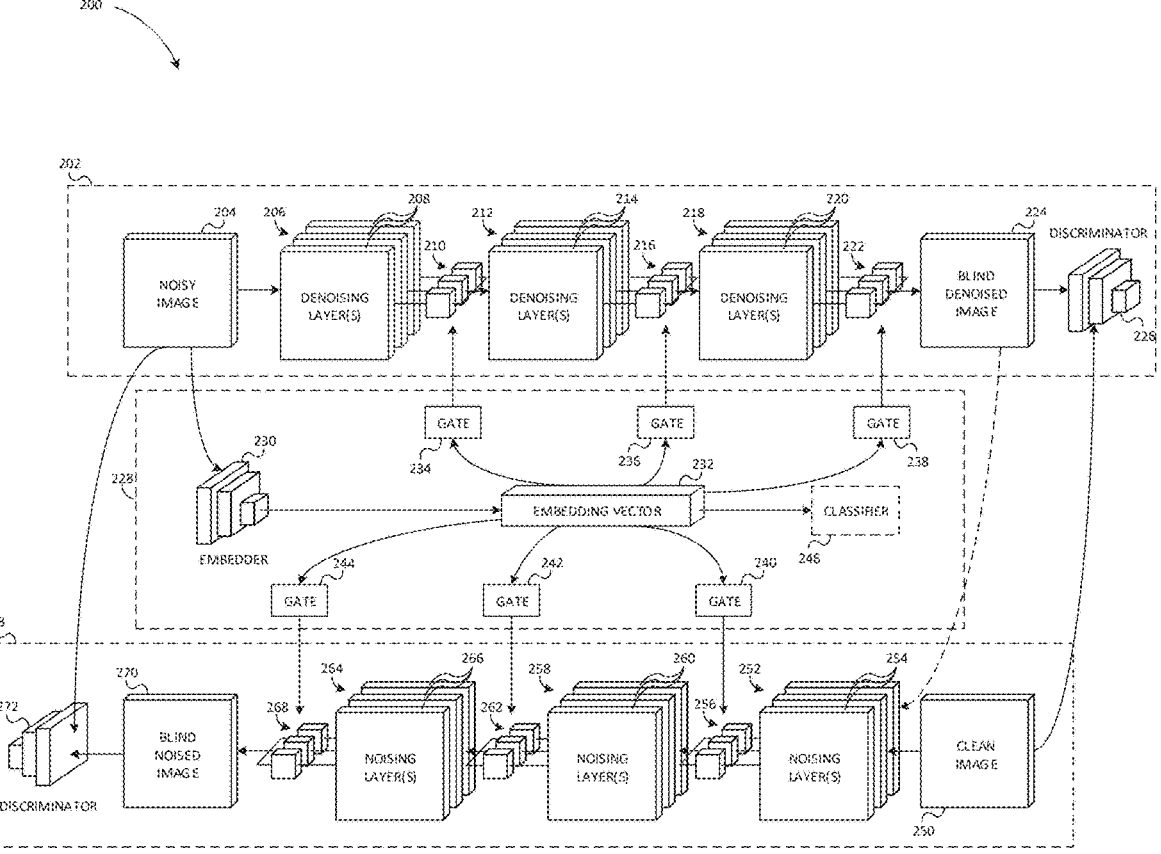
FIG. 2 is a diagrammatic illustration of an architecture of a CycleGAN using deep Mixture of Experts for end-to-end unsupervised multi-document blind image denoising, according to an embodiment.
Figures 5A, 5B, 5C, 5D:
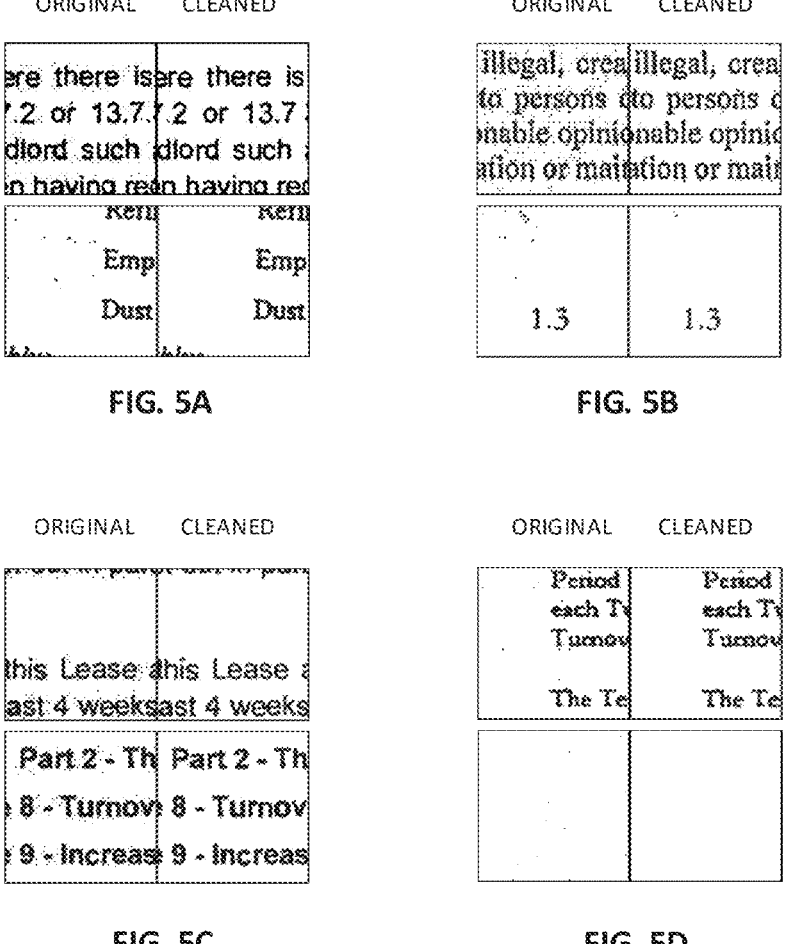
Figures 7A, 7B, 7C, 7D:
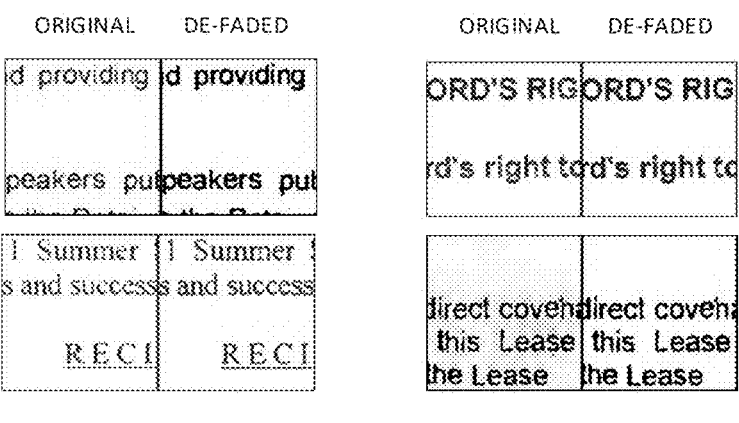

FIG. 2 is a diagrammatic illustration of an architecture 200 of a cycle-consistent GAN (or CycleGAN) using deep Mixture of Experts (MoE) for the blind image denoiser of FIG. 1, according to an embodiment. The CycleGAN, as shown in FIG. 2, is consistent with the CycleGAN 120 described in FIG. 1. The CylceGAN of FIG. 2 can include, for example, a convolutional neural network (CNN). The components of the architecture 200 of the CycleGAN includes two generators: a denoising generator 202 and a noising generator 248. The denoising generator 202 can also be referred as a "forward generator" (H) and the noising generator 248 can also be referred as a "backward generator" (F). The denoising generator 202 can also be referred as a "denoising domain" or part of a denoising domain. The noising generator 248 can also be referred as a "noising domain" or part of a noising domain. The CycleGAN also includes two adversarial discriminators. For instance, the denoising generator 202 includes a denoising discriminator 226 ($D_y$) and the noising generator 248 includes a noising discriminator 272 ($D_x$). The denoising generator 202 transforms a noisy image 204 into a blind denoised image 224 via at least one denoising layer of multiple denoising layers (e.g., denoising layer(s) 208, 214, 220) of the denoising generator 202 and/or denoising domain, where each denoising layer is associated with a noise type of multiple noise types. Each denoising layer (e.g., denoising layer(s) 208, 214, 220) includes multiple denoising channels (e.g., denoising channel(s) 210, 216, 222), where each denoising channel acts as an expert responsible in making a prediction (e.g., blindly denoising various patterns of a specific noise type found in the noisy image 204). In the noising domain (e.g., using the noising generator 248), the noising generator 248 can receive the blind denoised image 224 and generate a blind noised image via at least one noising layer of multiple noising layers (e.g., noising layer 254, 260, 266) of the noising generator 248 and/or noising domain, where each noising layer is associated with a noise type of multiple noise types. In some implementations, the noising generator 248 can receive the blind denoised image 224 and can transform the blind denoised image 224 into the blind noised image 270 via the at least one noising layer of multiple noising layers (e.g., noising layer 254, 260, 266) of the noising generator 248 and/or noising domain. Each noising layer (e.g., noising layer 254, 260, 266) includes multiple noising channels (e.g., noising channel(s) 256, 262, 268), where each noising channel acts as an expert responsible in making a prediction (e.g., blindly noising various patterns of a specific noise type found in the blind denoised image 224 to generate the blind noised image 270).

The architecture 200 of the CylceGAN also integrates a deep Mixture of Experts (MoE) 228 with the CycleGAN (e.g., the denoising generator 202 and the noising generator 248) as a base model. The MoE 228 operates within a single unified model (as opposed to multiple machine learning models) where the MoE 228 treats the multiple channels, such as the denoising channel(s) 210, 216, 222 and noising channel(s) 256, 262, 268 as experts. In some implementations, the MoE 228 of the architecture 200 extends to multiple MoE layers, such as denoising MoE layers 206, 212, 218 and noising MoE layers 252, 258, 264, where each denoising MoE layer and each noising MoE layer includes multiple convolutional layers (e.g. denoising layer(s) 208, 214, 220 and noising layer(s) 254, 260, 266, respectively).

In some implementations, the MoE 228 can include components, such as a base CNN and/or base model, an embedding network, and a multi-headed sparse gating network. The embedding network can include, for example, a shallow embedding network. For instance, the MoE 228 includes components such as an embedder 230 (E) configured to produce multiple mixture of weights (e.g., the denoising mixture weights and the noising mixture weights). In some instances, the MoE 228 can also include a classifier 246 (C) configured to classify the noisy image based on each noisy type.

The multi-headed sparse gating network of the MoE 228 can include, for example, two gating networks, such as a denoising gating network responsible for outputting a contribution (e.g. denoising mixture weights) for each denoising channel (e.g., denoising channel(s) 210, 216, 222) in denoising the noisy image 204 of a specific noise type and a noising gating network responsible for outputting a contribution (e.g., noising mixture weights) for each noising channel (e.g., noising channel(s) 256, 262, 268) in noising the blind denoised image 224. In some implementations, the MoE 228 treats the denoising channel(s) 210, 216, 222 and the noising channel(s) 256, 262, 268 as experts. The denoising gating network can be represented as $$g_H^* = G_H^{(1,\dots,L_H)}$$

and the noising gating network can be represented as $$g_F^* = G_F^{(1,\dots,L_F)},$$

where $L_H$ and $L_F$ are the number of convolutional layers (e.g., denoising layer(s) 208, 214, 220 and noising layer(s) 254, 260, 266) in the denoising generator 202 and the noising generator 248, respectively.

The architecture 200 of the CycleGAN and the MoE also includes multiple MoE layers, such as denoising MoE layers 206, 212, 218 and noising MoE layer(s) 252, 258, 264. In some implementations, for the denoising domain (i.e., the denoising generator 202), the MoE layer(s) can represent a group of components of the architecture 200, where each denoising MoE layer includes a denoising gate of multiple denoising gates 234, 236, 238, denoising channel(s) 210, 216, 222, and denoising layer(s) 208, 214, 220. In some implementations, for the noising domain (i.e., the noising generator 248), the MoE layer(s) can represent a group of components of the architecture 200, where each noising MoE layer includes a noising gate of multiple noising gates 240, 242, 244, noising channel(s) 256, 262, 268, and noising layer(s) 254, 260, 266. In some cases, the gates (e.g., denoising gate(s) 234, 236, 238 and noising gates 240, 242, 244) can also be referred to as "experts." In some implementations, the MoE 228 can include the embedder 230, which maps the noisy image 204 into multiple mixture weights (e.g., the denoising mixture weights and the noising mixture weights) to be fed into the into the multi-headed sparse gating network, including the denoising gating network and the noising gating network of the MoE 228. The MoE 228 can incorporate, for example, a 4-layer or 5-layer convolutional network to reduce the computational overhead of the shallow embedding network, including the embedder 230 of the MoE 228. In some implementations, the computed mixture weights (e.g., the denoising mixture weights and the noising mixture weights) can include a numerical value within a numerical range, where a higher number indicates a greater weight and a lower value indicates a lower weight. For instance, a mixture weight of 1 indicates normal, a mixture weight above 1 indicates an overweight, and/or a mixture weight below 1 weight indicates an underweight. In some cases, an overweight of a mixture weight for a denoising gate and/or a noising gate enables the denoising gate and/or the noising gate to denoise/noise an input image at a greater intensity.

In some implementations, the noisy image 204 can be fed into the denoising generator 202 (e.g., the denoising domain of the CycleGAN) and the embedder 230 of the MoE 228. In some cases, the embedder 230 can include, for example, a shallow embedder, a convolutional embedder, or the like. The embedder 230 can output a mixture of weights (e.g., the denoising mixture weights and the noising mixture weights), which can then be inputted into the multi-headed sparse gating network of the MoE 228 to select the experts (e.g., denoising channel(s) 210, 216, 222 and noising channel(s) 256, 262, 268) to be used in making predictions (i.e., generating the blind denoised image 224 and generating the blind noised image 270). For instance, the multi-headed sparse gating network can include two gating networks such as, for example, a denoising gating network and a noising gating network. The denoising gating network can also include the multiple denoising gates (e.g., denoising gates 240, 242, 244) for each noise type configured to select the denoising channel(s) 210, 216, 222 (i.e., experts) to use in denoising the noisy image 204 for each noise type (to some extent and/or various levels of intensity). The denoising gating network can take, as an input, a noise pattern based on the denoising mixture weights computed by the embedder 230 based on the noisy image 204 and outputs a selection of which denoising channel(s) 210, 216, 222 to use for each denoising layer (e.g., denoising layer(s) 208, 214, 220) in generating the blind denoised image 224. For the noising domain, the noising gating network can also include the multiple noising gates (e.g., noising gate(s) 240, 242, 244) for each noise type configured to select the noising channel(s) 256, 262, 268 to use in noising the blind denoised image 224 for each noise type (to some extent and/or various levels of intensity). The noising gating network can take, as an input, a noise pattern based on the noising mixture weights based to the blind denoised image 224 computed by the embedder 230 and outputs a selection of which noising channel(s) 256, 262, 268 to use for each nosing layer (e.g., noising layer(s) 254, 260, 266), in generating the blind noised image 270, where the blind image denoiser can compare the resulting blindly generated images (i.e., the blind denoised image 224 and the blind noised image 270) to verify the accuracy of the blind denoised image 224, to be labeled as the clean image 250. The mixture weights (e.g., the denoising mixture weights and the noising mixture weights) can be used to, by the denoising gating network (or the denoising gate(s) 234, 236, 238) and the noising gating network (or the noising gate(s) 240, 242, 244)

The embedder 230 can generate an embedding vector 232 by applying the noisy image 204 to the embedder 230. The embedding vector 232 can include representation of words of an image for text analysis or natural language (NLP) processing, where the words are converted into real value vectors. In some implementations, the embedder 230 can be trained with various noise types from multiple noisy images to better recognize actual text in inputted noisy documents (e.g., the noisy image 204) and ignore noise, to generate the embedding vector 232, where the embedding vector 232 includes more accurate semantic information of the words from the noisy documents. The embedding vector 232 can be used to label and/or identify the specific noise(s) or noise type(s) of the inputted noisy image 204 for the denoising gate(s) 234, 235, 238, that serves to select the experts (e.g., the denoising channel(s) 210, 216, 222) to use for each denoising layer (e.g., the denoising layer(s) 208, 214, 220) to generate the blind denoised image 224. The embedding vector 232 can be used to label and/or identify the specific noise(s) or noise type(s) of the inputted noisy image 204 for the denoising gate(s) 234, 236, 238, that serves to select the experts (e.g., the denoising channel(s) 210, 216, 222) to use for each denoising layer (e.g., the denoising layer(s) 208, 214, 220) to generate the blind denoised image 224. Each denoising gate (e.g., the denoising gate(s) 234, 236, 238) can determine how much of the denoising mixture weight is distributed for each denoising channel associated with each denoising gate for each denoising layer. For example, the embedder 230 produces multiple denoising mixture weights for each denoising gate 234, 236, 238. Based on the inputted noisy image 204 and the at least one noise type found in the noisy image 203, the embedder 230 can assign different denoising mixture weights to each denoising gate.

For example, the denoising gate 234, associated with the denoising MoE layer 206 and a specific noise type such as, for example, S&P noise, can enable and/or activate, based on the denoising mixture weight assigned to the denoising gate 234 based on the noise type(s) of the noisy image 204, one or more denoising channel(s) 210 within the same denoising MoE layer 206 and redistribute the assigned denoising mixture weight for the associated denoising layer(s) 208 via the one or more denoising channel(s) 210, to denoise the noisy image 204 of the S&P noise to some extent based on the redistributed denoising mixture weight. In another example, for the noising domain, the embedder 230 also produces multiple noising mixture weights for each noising gate 240, 242, 244. Based on the generated blind denoised image 224, the noising generator 248 and the at least one noise type cleaned from the noisy image 204, the embedder 230 can assign different noising mixture weights to each noising gate. For example, the noising gate 240, associated with the noising MoE layer 252 and a specific noise type such as, for example, S&P noise, can enable and/or activate, based on the noising mixture weight assigned to the noising gate 240 based on the noise type(s) of the noisy image 204, one or more noising channel(s) 256 within the same noising MoE layer 252 and redistribute the assigned noising mixture weight for the associated noising layer(s) 254 via the one or more noising channel(s) 256, to noise the blind denoised image 224 with S&P noise to some extent based on the redistributed noising mixture weight, to recreate the S&P noise and generate the blind noised image 270, which can be identical and/or similar to the noisy image 204. The denoising mixture weights and the noising mixture weights can be generated, based on observations of various noise types and various patterns of the various noise types, by the embedder 230 in a training process for the MoE 228, the embedder 230, and/or the denoising/noising gates.

In some cases, each denoising layer (e.g., denoising layer(s) 208, 214, 220) and/or each noising layer (e.g., noising layer(s) 254, 260, 266) can transform an incoming input image (e.g., the noisy image 204) based on a kernel or filter. The kernel or filter can be applied to each denoising/nosing layer and each denoising/noising channel. The kernel or filter can include a small matrix such as a 3×3 matrix. In some instances, each MoE layer can include multiple layers. In an example of a denoising pipeline where an input image is cleaned, the denoising generator 202 can receive a noisy image 204 containing S&P noise, faded text, and watermarks. The denoising MoE layer 206, including the denoising gate 234, the denoising channel(s) 210, and the denoising layer(s) 208, is associated with and/or responsible for denoising a noise type such as S&P nose, the denoising MoE layer 212 including its denoising gate 236, denoising channel(s) 216, and denoising layer(s) 214 can be responsible for denoising faded text, and the denoising MoE layer 218 including its denoising gate 238, denoising channel(s) 222, and denoising layer(s) 220 can be responsible for denoising watermarks. Each of the denoising MoE layers 206, 212, 218 receives, at a time, the noisy image 204, to remove the various noise of the noisy image 204 at least one noise type at a time, to generate the blind denoised image 224. In some cases, the embedder 230 can generate denoising mixture weights for each of the denoising gate(s) 234, 236, 238, based on specific noise patterns of each noise type. For instance, the S&P noise can include patterns such as patches of an image with concentrated dots, the faded text noise can include patterns such as ink smears or fingerprint smudges, and watermark noise can include logos, watermarks behind lines of text, or the like. Similarly, to generate the blind noised image 270, each of the noising MoE layer 252, 258, and/or 264 can receive, at a time, the blind denoised image 224, to add the various noise types that were removed in the blind denoised image 224 (and/or found in the noisy image 204) at least one noise type at a time, to generate the blind noised image 270.

Alternatively or additionally, each of the denoising MoE layer 206, 212, 218 can receive the noisy image 204 and remove the various noise types of the noisy image 204 in parallel to generate the blind denoised image 224. For example, each denoising MoE layer 206, 212, 218 can receive the noisy image 204 as an input and denoise the noisy image 204 of each noise type associated with each denoising MoE layer 206, 212, 218, to generate the blind denoised image 224, where the blind denoised image 224 can be an accumulation of multiple partially denoised images of each of the denoising MoE layer 206, 212, 218. Similarly, each of the noising MoE layer 252, 258 264, can receive the blind denoised image 224 and add the various noise types that were removed in the blind denoised image 224 in parallel to generate the blind noised image 270. For example, each of the noising MoE layer 252, 258 264 can receive the blind denoised image 224 as an input and add various noises of each noise type associated with each noising MoE layer 252, 258 264 to generate multiple partially noised images that can be combined to generate the blind noise image 270.

Continuing with the example of the denoising pipeline, the denoising MoE layer 206, which is associated with S&P noise, can include multiple denoising layer(s) 208, where each layer of the denoising layer(s) 208 is associated with a channel of the denoising channel(s) 210. Each denoising layer(s) 208 and/or each denoising channel(s) 210 of the denoising MoE layer 206 can be affected based on the denoising mixture weight provided by the embedder 230 and/or the selection of experts (e.g., the denoising channel(s) 210) by the denoising gate 234 of the denoising MoE layer 206. In some cases, a combination of layers of the denoising layer(s) 208 can be enabled and/or activated based on the denoising mixture weight assigned to the denoising gate 234, where the combination of layers can be used to transform the noisy image 204 at a certain intensity and/or intensity threshold. In some cases, the combination of layers and/or each layer of the denoising layer(s) 208, 214, 220, can be associated with specific noise patterns for each noise type that the denoising layer(s) 208, 214, 220 are associated with. For instance, the combination of layers and/or each layer of the denoising layer(s) 208 can be associated with specific S&P noise patterns. The embedder 230 can identify that the noisy image 204 contains S&P noise and provide the denoising mixture weight enabling the denoising MoE layer 206 including the denoising layer(s) 208, the denoising channel(s) 210, and the denoising gate 234 to transform the noisy image 204 by removing S&P noise found in the noisy image 204. The noisy image 204, now removed of S&P noise (to at least an extent) can be transformed again via the denoising MoE layer 212 responsible for denoising faded text from the noisy image 204 removed of S&P noise.

Continuing with the example of the denoising pipeline, the denoising MoE layer 212, which is associated with faded text, can include multiple denoising layer(s) 214, where each layer of the denoising layer(s) 214 is associated with a channel of the denoising channel(s) 216. Each denoising layer(s) 214 and/or each denoising channel(s) 216 of the denoising MoE layer 212 can be affected based on the denoising mixture weight provided by the embedder 230 and/or the selection of experts (e.g. the denoising channel(s) 216) by the denoising gate 236 of the denoising MoE layer 212. In some cases, a combination of layers of the denoising layer(s) 214 can be enabled and/or activated based on the denoising mixture weight assigned to the denoising gate 236, where the combination of layers can be used to transform the noisy image 204 and remove faded text at a certain intensity and/or intensity threshold. For instance, the combination of layers and/or each layer of the denoising layer(s) 214 can be associated with specific faded text patterns. The embedder 230 can identify that the noisy image 204 contains faded text and provide the denoising mixture weight enabling the denoising MoE layer 212 including the denoising layer(s) 214, the denoising channel(s) 216, and the denoising gate 236 to transform the noisy image 204 by removing faded text found in the noisy image 204. The noisy image 204, now removed of faded text and S&P noise (to at least an extent) can be transformed again via the denoising MoE layer 218 responsible for denoising watermarks from the noisy image 204 removed of faded text S&P noise.

Continuing with the example of the denoising pipeline, the denoising MoE layer 218, which is associated with watermarks, can include multiple denoising layer(s) 220, where each layer of the denoising layer(s) 220 is associated with a channel of the denoising channel(s) 222. Each denoising layer(s) 220 and/or each denoising channel(s) 222 of the denoising MoE layer 218 can be affected based on the denoising mixture weight provided by the embedder 230 and/or the selection of experts (e.g. the denoising channel(s) 222) by the denoising gate 238 of the denoising MoE layer 218. In some cases, a combination of layers of the denoising layer(s) 220 can be enabled and/or activated based on the denoising mixture weight assigned to the denoising gate 238, where the combination of layers can be used to transform the noisy image 204 and remove watermarks at a certain intensity and/or intensity threshold. For instance, the combination of layers and/or each layer of the denoising layer(s) 220 can be associated with specific watermarks patterns. The embedder 230 can identify that the noisy image 204 contains watermarks and provide the denoising mixture weight enabling the denoising MoE layer 218 including the denoising layer(s) 220, the denoising channel(s) 222, and the denoising gate 238 to transform the noisy image 204 by removing watermarks found in the noisy image 204. The noisy image 204 is now transformed and the blind denoised image 224 is generated. In some implementations, the denoising generator 202 can include more than three denoising MoE layers for additional noise types.

To verify that the blind denoised image 224 is correct (i.e., the resulting image is accurately cleaned and preserves the important contents such as text), a noising pipeline including the noising generator 248 can receive the blind denoised image 224 to generate the blind noised image 270 and compare the blind noised image 270 with the noisy image 204 to verify that the blind denoised image 224 is accurate. In other words, the noising pipeline aims to recreate/re-add the removed noise back on the newly generated blind denoised image 224 to ensure that the denoising of the noisy image 202 was performed accurately (at least to some extent). In some instances, the resulting blind noised image 270 can be similar and/or identical to the noisy image 204, verifying that the blind denoised image 224 is accurate.

Continuing with the example of the noising pipeline, the noising MoE layer 252, which is associated with the S&P noise, can include multiple noising layer(s) 254 each of which is associated with a channel of the noising channel(s) 256. Each noising layer(s) 254 and/or each noising channel(s) 256 of the noising MoE layer 252 can be affected based on the noising mixture weight provided by the embedder 230 and/or the selection of experts (e.g., the noising channel(s) 256) by the noising gate 240 of the noising MoE layer 252. In some cases, a combination of layers of the noising layer(s) 254 can be enabled and/or activated based on the noising mixture weight assigned to the noising gate 240, where the combination of layers can be used to transform the blind denoised image 224 at a certain intensity and/or intensity threshold. For instance, the combination of layers and/or each layer of the noising layer(s) 254 can be associated with specific S&P noise patterns. Based on the denoising gate(s) 234, 236, 238 used to generate the blind denoised image 224, the embedder 230 can assign the denoising mixture weights for the corresponding noising gate(s) 240, 242, 244, to generate the various noise types using the blind denoised image 224 as an input for generating the blind noised image 270. In other words, the embedder 230 can enable and/or activate the corresponding noising gate 240 associated with the noise type that was denoised in the denoising pipeline. The embedder 230 can also provide the noising mixture weight enabling the noising MoE layer 252, including the noising layer(s) 254, the noising channel(s) 256, and the noising gate 240, to transform the blind denoised image 224 by adding the S&P noise to the blind denoised image 224, where the S&P noise was similarly removed from the noisy image 204 in the denoising pipeline. The blind denoised image 224, now containing the S&P noise (to at least an extent) can be transformed again via the noising MoE layer 212 responsible for adding faded text to the blind denoised image 224 now containing the S&P noise.

Continuing with the example of the noising pipeline, the noising MoE layer 258, which is associated with faded text, can include multiple noising layer(s) 260 each of which is associated with a channel of the noising channel(s) 262. Each noising layer(s) 260 and/or each noising channel(s) 262 of the noising MoE layer 258 can be affected based on the noising mixture weight provided by the embedder 230 and/or the selection of experts (e.g. the noising channel(s) 262) by the noising gate 242 of the noising MoE layer 258. In some cases, a combination of layers of the noising layer(s) 260 can be enabled and/or activated based on the noising mixture weight assigned to the noising gate 242, where the combination of layers can be used to transform the blind denoised image 224 at a certain intensity and/or intensity threshold. For instance, the combination of layers and/or each layer of the noising layer(s) 260 can be associated with specific faded text patterns. The embedder 230 can enable and/or activate the corresponding noising gate 242 associated with the noise type that was denoised in the denoising pipeline. The embedder 230 can also provide the noising mixture weight enabling the noising MoE layer 258, including the noising layer(s) 260, the noising channel(s) 262, and the noising gate 242, to transform the blind denoised image 224 by adding faded text to the blind denoised image 224, where faded text was similarly removed from the noisy image 204 in the denoising pipeline. The blind denoised image 224, now containing faded text and the S&P noise (to at least an extent) can be transformed again via the noising MoE layer 212 responsible for adding watermarks to the blind denoised image 224 now containing faded text and the S&P noise.

Continuing with the example of the noising pipeline, the noising MoE layer 264, which is associated with watermarks, can include multiple noising layer(s) 266 each of which is associated with a channel of the noising channel(s) 268. Each noising layer(s) 266 and/or each noising channel(s) 268 of the noising MoE layer 264 can be affected based on the noising mixture weight provided by the embedder 230 and/or the selection of experts (e.g., the noising channel(s) 268) by the noising gate 244 of the noising MoE layer 264. In some cases, a combination of layers of the noising layer(s) 266 can be enabled and/or activated based on the noising mixture weight assigned to the noising gate 244, where the combination of layers can be used to transform the blind denoised image 224 at a certain intensity and/or intensity threshold. For instance, the combination of layers and/or each layer of the noising layer(s) 266 can be associated with specific watermark patterns. The embedder 230 can enable and/or activate the corresponding noising gate 244 associated with the noise type that was denoised in the denoising pipeline. The embedder 230 can also provide the noising mixture weight enabling the noising MoE layer 264, including the noising layer(s) 266, the noising channel(s) 268, and the noising gate 244, to generate the blind denoised image 224 by adding watermarks to the blind denoised image 224, where watermarks was similarly removed from the noisy image 204 in the denoising pipeline. The blind denoised image 224 can now contain watermarks, faded text, and the S&P noise (to at least an extent).

The denoising pipeline and the noising pipeline can include denoising the noisy image 204 of various noise types and noising the blind denoised image 224 with various noise types in any order. Training of the MoE 228 can include sequential training of the denoising gates (e.g., the denoising gates 235, 236, 238) and/or the noising gates (e.g., the noising gates 240, 242, 244). For example, the MoE 228 can be trained with a training dataset having more difficult noise types such as S&P noise for a number of epochs. In some instances, the training with the training dataset with the S&P noise can be stopped for the training of the MoE 228 with a different training dataset including a different noise type, such as blurred text, for a number of epochs, with only 10% of the S&P noise training dataset has been used to train the MoE 228. The training with the blurry text training dataset can be further stopped to train the MoE 228 with another training dataset including faded text for a number of epochs, with only 10% of the S&P noise training dataset and only 10% of the blurry text training dataset has been used. In some instances, during the sequential training, the training with the S&P noise training dataset can resumed, and so forth, until satisfactory training results for all noise types are reached.

In some implementations, the architecture 200 of the CycleGAN can be an architecture for training the MoE 228. For instance, the MoE 228 includes the single unified model. In some cases, the single unified model can refer to the MoE 228, the embedder 230, and/or the gating network (i.e., denoising gating network and/or noising gating network). The blind image denoiser is configured to learn a generator function that enables the CycleGAN to generate the blind denoised image 224 and/or the clean image 250 ($y \in Y$) based on the input image (e.g., the noisy image 204) ($x \in X$). Every noisy image, including the noisy image 204, is labeled by at least one noise type, which can be defined by $c_x \in C$. As described herein, the noise types can include, for example, S&P noise, blur, faded text, watermarks, and/or the like. Training the pipeline of the architecture 200 of the Cycle-GAN can include sampling a tuple composed of the noisy image 204 and/or any noisy image, and its noise type label $(x, c_x) \in X \times C$ and a clean unpaired image ($y \in Y$). The training does not require pre-existing clean images and uses some metadata such as noise type to train the embedder 230 of the MoE 228.

In some implementations, the first step of a training pipeline of the architecture 200 includes receiving an embedding vector $e_x \in \mathbb{R}^d$ by applying the noisy image 204 to the embedder 230, which can be represented as $e_x = E(x)$. The next step can include calculating the outputs for denoising gate(s)

$$234, 236, 238 \quad g_H^i = G_H^i(e_x) \in \mathbb{R}_+^{N_H^i} \text{ for } i \in \{1, \dots, L_H\}$$

and the noising gate(s)

$$240, 242, 244 \quad g_F^i = G_F^i(e_x) \in \mathbb{R}_+^{N_F^i} \text{ for } i \in \{1, \dots, L_H\},$$

where $$N_H^i$$

refers to the number of denoising channel(s) 210, 216, 222 in each denoising MoE layer (e.g. denoising MoE layer 206, 212, 218) in the denoising generator 202 and $$N_F^i$$

refers to the number of noising channel(s) 256, 262, 268 in each noising MoE layer (e.g. noising MoE layer 252, 258, 264) in the noising generator 248. The embedder 230 can also predict a label $\hat{c}_x$ identifying the noise type of the noisy image 204 (X) based on the embedding vector 232 (i.e. $\hat{c}_x = C(e_x)$).

The training pipeline can apply the gating networks, i.e. the denoising gating network $$g_H^i$$

including the denoising gate(s) 234, 236, 238 and the noising gating network $$g_F^i$$

including the noising gate(s) 240, 242, 244 to the CycleGAN generators (i.e. the denoising generator 202 and the noising generator 248, respectively). The denoising generator 202 generates the blind denoised image 224, i.e.

$$\hat{y} = H\left(x, g_H^1, \ldots, g_H^{L_H}\right),$$

and the noising generator 248 generates the blind noised image 270, i.e.

$$\hat{x} = F\left(y, g_F^1, \ldots, g_F^{L_F}\right).$$

Both generators (e.g., the denoising generator 202 and the noising generator 248) replace standard convolutional layers of a single layer MoE model with MoE layers (e.g., the denoising MoE layers 206, 212, 218 and the noising MoE layers 252, 258, 264) for the MoE 228 (i.e., deep MoE) by calculating $$h_0^{t+1} = \sum_{i=1}^{N_H^t} (g_H^t)_i K_i^t * h_i^t,$$

where $h^t$ is an output tensor of the t-th layer (e.g. denoising layers 208, 214, 220 and/or noising layer(s) 254, 260, 266), * is a convolutional operator, and $$K_i^t$$

denotes a kernel for the t-th layer and the i-th channel (e.g., denoising channel(s) 210, 216, 222 and/or noising channel(s) 256, 262, 268). The denoising discriminator 226 can generate a score for the blind denoised image 224, i.e.

$D_x(x) \in [0,1]$ and the noising discriminator 272 can generate a score for the blind noised image 270, i.e. $D_y(y) \in [0,1]$. In some implementations, the score for the blind denoised image 224 can include a blind score for the denoising prediction of the noisy image 204. The score for the blind noised image 270 can include a match score based on a comparison between the noisy image 204 and the blind noised image 270, where a higher match score indicates that the blind noised image 270 is closer to being identical to the noisy image 204, confirming that the prediction of the generated blind denoised image 224 is accurate, thus labeling the blind denoised image 224 as the clean image 250. The CycleGAN and the MoE 228 can be configured to perform the steps described above automatically.

In some implementations, the discriminators (e.g., the denoising discriminator 226 and the noising discriminator 272) can include 70×70 PatchGAN, which classifies 70×70 overlapping patches of noise on an image as real or fake. The embedder 230 can include a 7-layer CNN with kernel size of 3×3, batch normalization, and rectified linear activation functions. In some implementations, the classifier 246, which can be the last layer of the embedder 230, can be a fully connected layer with SoftMax activation function and cross-entropy loss function for classification of the patches based on their noise type. The gating network (e.g. the denoising gating network and the noising gating network) can be fully connected networks with rectified linear activation functions. In some implementations, the architecture 200 of the CycleGAN and the MoE 228 can include fully connected network (64×256) including 18 gating networks, where 9 of the gating networks include the denoising gating networks (or denoising gate(s) 234, 236, 238) for the denoising generator 202 and the other 9 of the gating networks include the noising gating networks (or noising gate(s) 240, 242, 244) for the noising generator 248. In some implementations, the embedder 230 and the classifier 246 can include an autoencoder to train the embedding vector 232 in an unsupervised manner.

The CycleGAN and the MoE 228 can incorporate loss functions to improve the predictions of the single unified model, the blind denoised image 224 and/or the blind noised image 270. Two loss functions can be applied to formulate the CycleGAN generators (e.g. the denoising generator 202 and the noising generator 248) with the MoE layers (e.g. the denoising MoE layers 206, 212, 218 and the noising MoE layer(s) 252, 258, 264). The loss function for the denoising generator 202 and the noising generator 248 includes:

$$H^{MoE}(x, x) = H\left(x, G_H^1(E(x)), \ldots, G_H^{L_H}(E(x))\right)$$

$$F^{MoE}(x, x) = F\left(x, G_F^1(E(x)), \ldots, G_F^F(E(x))\right)$$

where the noisy image 204 is provided to the embedder 230 and the gating networks. Additionally the CycleGAN can include an objection function based on two loss functions, the GAN loss $\mathcal{L}_{GAN}$ for the denoising generator 202 (i.e. $H^{MoE}$) includes:

$$\mathcal{L}_{GAN}\left(H^{MoE}, D_y, X, Y\right) = \mathbb{E}_{y \sim Y}[\log D_y(y)] + \mathbb{E}_{x \sim X}\left[1 - \log D_y\left(H^{MoE}(y, x)\right)\right]$$

Similarly, the GAN loss $\mathcal{L}_{GAN}$ for the noising generator 248 (i.e. $F^{MoE}$) includes:

$$\mathcal{L}_{GAN}\!\left(F^{MoE}, D_x, Y, X\right) =$$

$$\mathbb{E}_{x\sim X}[\log D_x(x)] + \mathbb{E}_{y\sim Y, x\sim X}\!\left[1 - \log D_x\!\left(F^{MoE}(y, x)\right)\right]$$

The CycleGAN and the MoE 228 can include another loss function such as, for example, a cycle-consistency loss $\mathcal{L}_{cyc}$ that preserves the contents of an input image. For instance, when the noisy generator 202 receives the noisy image 204 to be denoised, the noisy generator 202 aims to preserve natural language characters such as text while removing various noises found in the noisy image 204. The cycle-consistency losses $\mathcal{L}_{cyc}$ can be represented as:

$$\mathcal{L}_{cyc}\!\left(H^{MoE}, F^{MoE}, X, Y\right) =$$

$$\mathbb{E}_{x\sim X}\!\left[\left\|F^{MoE}\!\left(H^{MoE}(x, x), x\right) - x\right\|_1\right] + \mathbb{E}_{y\sim Y, x\sim X}\!\left[\left\|H^{MoE}\!\left(F^{MoE}(y, x), x\right) - y\right\|_1\right]$$

The CycleGAN and the MoE 228 of the architecture 200 also includes a loss function based on a combination of loss functions of the $\mathcal{L}_{GAN}$ and $\mathcal{L}_{cyc}$ for the denoising generator 202 and the noising generator 248:

$$\mathcal{L}_{cyc-GAN}\!\left(H^{MoE}, F^{MoE}, \mathcal{D}_X, \mathcal{D}_Y, X, Y\right) = \mathcal{L}_{GAN}\!\left(H^{MoE}, \mathcal{D}_Y, X, Y\right) +$$

$$\mathcal{L}_{GAN}\!\left(F^{MoE}, \mathcal{D}_X, Y, X\right) + \lambda_{cyc}\mathcal{L}_{cyc}\!\left(H^{MoE}, F^{MoE}, X, Y\right)$$

In some implementations, training the MoE 228 and/or the MoE layers can incorporate an optimization function and/or loss function (e.g. cross-entropy loss) that follows:

$$\mathcal{L}_{MoE}(E, G_H^*, G_F^*, C, X, C) = \mathbb{E}_{x, c_x \sim X, C}[CrossEntropy(C(E(x, c_x)))] +$$

$$\lambda_{G_H}\mathbb{E}_{x\sim X}\!\left[\sum_{l=1}^{L_H}\left\|G_H^l(E(x))\right\|_1\right] + \lambda_{G_F}\mathbb{E}_{x\sim X}\!\left[\sum_{l=1}^{L_F}\left\|G_F^l(E(x))\right\|_1\right]$$

The total loss function for training the integrated CylceGAN and the MoE 228 of FIG. 2 is derived by combining the CycleGAN loss ($\mathcal{L}_{cyc\text{-}GAN}$) and the MoE loss ($\mathcal{L}_{MoE}$) that follows:

$$\mathcal{L}_{cyc-GAN}\!\left(H^{MoE}, F^{MoE}, \mathcal{D}_X, \mathcal{D}_Y, X, Y\right) + \lambda_{MoE}\mathcal{L}_{MoE}(E, G_H^*, G_F^*, C, X, C)$$

FIG. 3 is a flowchart of a method 300 for end-to-end unsupervised multi-document blind image denoising, according to an embodiment. At 305, the method 300 includes receiving, via a processor of a blind image denoiser, a noisy image that includes at least one noise type of a multiple of noise types and an image structure type. The noisy image does not include a paired pre-existing clean image, which is a clean version of the noisy image and does not contain noise. The multiple noise types can include, for example, S&P noise, faded text, blurred text, watermarks, or the like. In some cases, every noisy image can be based on an image structure type, such as, for example, unstructured, semi-structured, and/or structured. For instance, unstructured types can include, for example, lease documents that generally have S&P, faded text, and/or blurry text. In another example, semi-structure types can include invoices, where invoices generally have watermarks, stamps, S&P, and/or blurry texts. In another example, structured types can include K1 forms, which generally have watermarks.

At 310, the method 300 includes generating a blind denoised image from the noisy image using at least one denoising layer of a plurality of denoising layers of a machine learning model based on the at least one noise type and the image structure type of the noisy image. In some implementations, the machine learning model can include an unsupervised machine learning model, an end-to-end machine learning model, or the like thereof. In some implementations, receiving the noisy image can include receiving the noisy image via a CycleGAN (or CycleGAN network), where the CycleGAN includes a denoising generator and a noising generator. The CycleGAN is integrated with a Mixture of Experts (MoE), where the MoE is a deep MoE including a single unified model. In some cases, the machine learning model can refer to the MoE. In some implementations, generating the blind denoised image includes transforming the noisy image in a pipeline fashion. For instance, the denoising generator can include multiple denoising layers where a first denoising layer can receive the noisy image, transform the noisy image, and send the transformed noisy image to a second denoising layer, and so on, where the last denoising layer, transforms the transformed noisy image and generates the blind denoised image. Each denoising layer is associated with and/or responsible for removing a specific noise type (to at least an extent) of an input image.

In some implantations, the MoE can include an embedder that computes multiple denoising mixture weights for each denoising gate, where each denoising gate of multiple denoising gates is configured to distribute its denoising mixture weight to at least one denoising channel of multiple denoising channels of the at least on denoising layer of multiple denoising layers. In some cases, each denoising gate can be configured to trust, enable, and/or activate the at least one denoising channel of each denoising layer. The denoising gate can trust, enable, and/or activate the at least one denoising channel based on the intensity of the specific noise type that each denoising gate is associated with and/or responsible for denoising. For instance, the noisy image can include heavy S&P noise, negligible faded text, and low opaque watermarks, where the denoising gates can remove various noise types based on the intensity of each noise type found in the noisy image.

At 320, the method includes generating a blind noised image from the blind denoised image using at least one noising layer of a plurality of noising layers of the machine learning model based on the at least one noise type and the image structure type of the noisy image. For instance, to verify the accuracy of denoising the noisy image and/or the accuracy of the generated blind denoised image, the Cylce-GAN can remake the removed noise on the blind denoised image to generate the blind noised image. In some implementations, the CycleGAN includes a noising generator and multiple noising layers associated with and/or responsible for noising the blind denoised image with a specific noise type associated with each noising layer. In some implementations, generating the blind noised image includes transforming the blind denoised image in a pipeline fashion. For instance, the noising generator can include multiple noising layers where a first noising layer can receive the blind denoised image, transform the blind denoised image, and send the transformed blind denoised image to a second noising layer, and so on, where the last noising layer, transforms the transformed blind denoised image and generates the blind noised image. Each noising layer is associated with and/or responsible for adding a specific noise type (to at least an extent) on the blind denoised image.

In some implantations, the embedder of the MoE can compute multiple noising mixture weights for each noising gate of the MoE, where each noising gate of multiple noising gates is configured to distribute its noising mixture weight to at least one noising channel of multiple noising channels of the at least on noising layer of multiple noising layers. In some cases, each noising gate can be configured to trust, enable, and/or activate the at least one noising channel of each noising layer. The noising gate can trust, enable, and/or activate the at least one noising channel based on the intensity of the specific noise type that was previously removed by the at least one noising layer to generate the blind denoised image.

At 325, the method 300 further includes calculating a match score based on a comparison between the noisy image and the blind noised image to determine a clean image of the noisy image. The match score can include, for example, a numerical value, numerical range, Boolean, or the like, indicating the accuracy in similarity of a comparison between the noisy image and blind noised image.

At 330, the method 300 further includes generating an image pair based on the match score being above a match threshold, the image pair including the clean image and the noisy image. If the comparison between the blind noised image and the noisy image indicates a sufficient accuracy, the noisy image can be paired with the generated blind denoised image, which can be labeled as the clean image. In some implementations, the method 300 can further include training a supervised machine learning model with generated image pairs to predict other blind denoised images. For instance, the noisy image including a first noisy image, the image structure type is a first image structure type, the at least one noise type is at least a first noise type, the clean image is a first clean image, the match score is a first match score, and the image pair is a first image pair. The method 300 can include receiving a second noisy image, where second noisy image includes at least a second noise type of the plurality of noise types and a second image structure type, training the supervised machine learning model based on the first image pair, to produce a trained model, and executing the trained model using the second image to generate a second clean image. In some implementations, the method 300 can include receiving multiple noisy images to generate multiple image pairs and continuously and/or iteratively train the trained model. The training can be done simultaneously and receive the multiple noisy images from multiple different devices.

FIG. 4A is a table of a training dataset for a system for a blind image denoiser, according to an embodiment. FIG. 4A show training datasets used to train the machine learning model of the blind image denoiser of FIG. 1. The training dataset of FIG. 4A can also be used to train the machine learning model (i.e., the single unified model of the MoE) of FIG. 2. To prepare a training dataset, images of various types and noises can be used. In some cases, the most common noise types on lease contracts are S&P noise, blurred, or faded text, whereas tax forms and invoices are mostly in digital format containing watermarks. The number of images in each category is shown in FIG. 4A. Overlapping patches of 256×256 pixels with the stride of 128 pixels can be extracted from the images to train the machine learning model and/or the end-to-end unsupervised machine learning model of the blind denoiser. The training dataset of FIG. 4A includes images classified by their image structure type (e.g., unstructured, semi-structured, and structured) and specific types of documents of each image structure type (e.g., lease contracts for unstructured, K1 forms for structured, and invoices for semi-structured). Each image is further classified by noise type (e.g., S&P noise, blurred, faded text, watermarks, etc.), where the images are paired by their noise type. For instance, a noisy image with S&P noise is not paired with a target clean image that is a cleaned version of the noisy image; the noisy image is paired with some other clean image denoised of the same noise type, i.e., S&P noise, where the paired clean image may or may not be the clean version of the noisy type. In other words, noisy/clean pairs are formed based on their noise type rather than the noisy images' actual target clean pairs.

FIG. 4B is a table of testing datasets for a system for a blind image denoiser, according to an embodiment. FIG. 4B can include various testing datasets of various types of images and/or documents containing various noise types to test the blind image denoiser of FIG. 1 or FIG. 2. FIG. 4B can include a testing dataset to evaluate the performance of training the blind image denoiser with the training dataset of FIG. 4A. The testing dataset of FIG. 4B can include three datasets using images from various sources, images of various noise types, and the number of images.

FIGS. 5A-F are various image pairs of noisy documents with salt & pepper noise and cleaned documents, according to an embodiment. Each image pair includes a patch of a noisy image and a patch of a paired cleaned image, where the noisy image pairs contain S&P noise and their paired cleaned images do not contain the S&P noise.

FIGS. 6A-F are various image pairs of noisy documents with blur and de-blurred documents, according to an embodiment. Each image pair includes a patch of a noisy image and a patch of a paired cleaned image, where the noisy image pairs contain blur and their paired cleaned images are de-blurred.

FIGS. 7A-F are various image pairs of noisy documents with fade and de-faded documents, according to an embodiment. Each image pair includes a patch of a noisy image and a patch of a paired cleaned image, where the noisy image pairs contain faded noise and their paired cleaned images are de-faded.

Figures 8A, 8B:
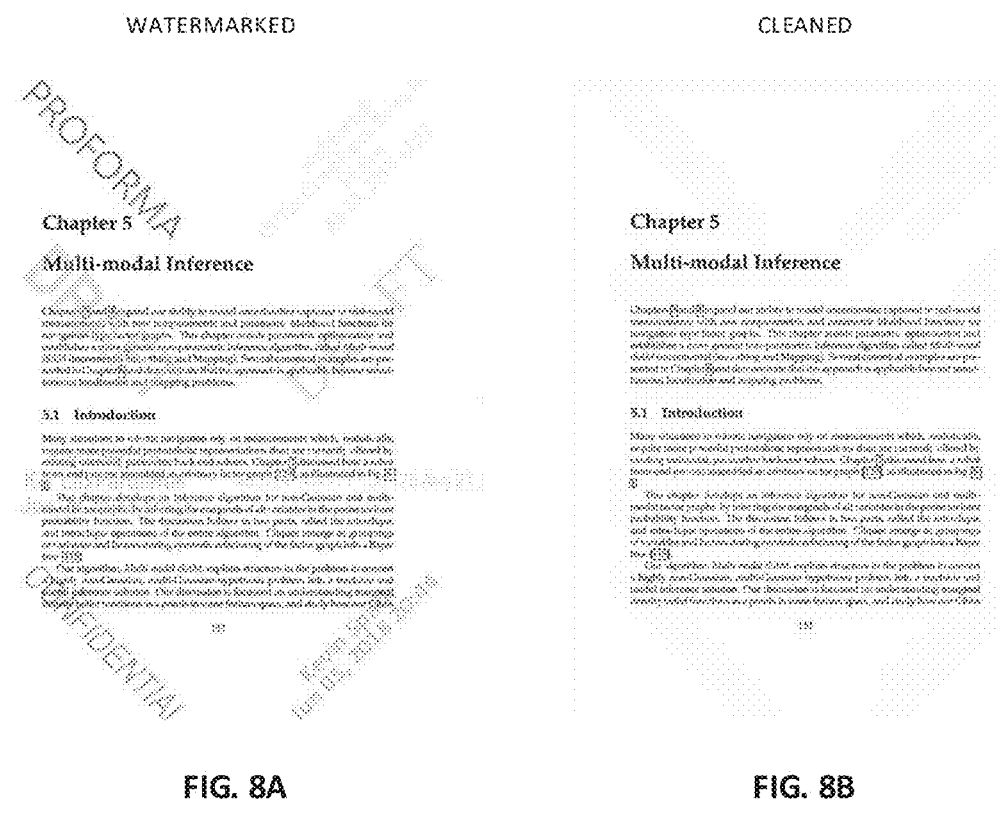

FIGS. 8A-B are an image pair of a noisy document with watermark and a cleaned document, according to an embodiment. Each image pair includes a patch of a noisy image and a patch of a paired cleaned image, where the noisy image pairs contain watermarks and their paired cleaned images do not contain watermarks.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" can refer to one or more programs, routines, sub-routines, functions, procedures, etc. "Instructions" and "code" can comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus comprising:

a processor; and a memory operatively coupled to the processor, the memory storing instructions to cause the processor to:
receive a noisy image,
generate a denoised image based on the noisy image,
generate, based on the denoised image, a noised image and a classification of the denoised image,
generate, based on the noised image, a classification of the noised image, and
generate a clean image based on a comparison between the classification of the denoised image and the classification of the noised image.

2. The apparatus of claim 1, wherein:

the noisy image is associated with a document type; and the classification of the denoised image and the classification of the noised image indicate the document type.

3. The apparatus of claim 1, wherein:

the noisy image is associated with at least one of a structured document type, a semi-structured document type, or an unsupervised document type; and the classification of the denoised image and the classification of the noised image indicate the at least one of the structured document type, the semi-structured document type, or the unsupervised document type.

4. The apparatus of claim 1, wherein the memory stores instructions to further cause the processor to:

generate, based on the denoised image, a first noise intensity value; and generate, based on the noised image, a second noise intensity value, the clean image being generated based further on a comparison between the first noise intensity value and the second noise intensity value.

5. The apparatus of claim 1, wherein the memory stores instructions to further cause the processor to:

determine, based on the denoised image, a first noise type; and determine, based on the noised image, a second noise type, the clean image being generated based further on a comparison between the first noise type and the second noise type.

6. The apparatus of claim 1, wherein the memory stores instructions to further cause the processor to:

classify the denoised image as having at least one of salt & pepper (S&P) noise, blurred text, faded text, a shading, or a watermark; and classify the noised image as having the at least one of the S&P noise, the blurred text, the faded text, the shading, or the watermark, the clean image being generated based further on the denoised image and the noised image being classified as having the at least one of the S&P noise, the blurred text, the faded text, the shading, or the watermark.

7. The apparatus of claim 1, wherein:

the clean image is a clean instance of the noisy image.

8. The apparatus of claim 1, wherein:

the instructions to cause the processor to generate the denoised image include instructions to cause the processor to:

compute, via an embedder and based on the noisy image, a denoising mixture weight for each denoising gate from a plurality of denoising gates associated with a plurality of channels of the noisy image, to generate a plurality of denoising mixture weights, and apply the plurality of denoising mixture weights to the noisy image to generate the denoised image; and the instructions to cause the processor to generate the noised image include instructions to cause the processor to:

compute, via the embedder and based on the denoised image, a noising mixture weight for each noising gate from a plurality of noising gates associated with a plurality of channels of the denoised image, to generate a plurality of noising mixture weights, and apply the plurality of noising mixture weights to the denoised image to generate the noised image.

9. An apparatus comprising:

a processor; and a memory operatively coupled to the processor, the memory storing instructions to cause the processor to:

receive a first image;

input the first image to a first machine learning model to generate (i) a second image that depicts more noise than the first image and (ii) a classification of the first image;

input the second image to a second machine learning model to generate a classification of the second image; and generate a third image based on a comparison between the classification of the first image and the classification of the second image.

10. The apparatus of claim 9, wherein the memory stores instructions to further cause the processor to:

receive, before receiving the first image, a fourth image that depicts less noise than the first image; and input the fourth image to a third machine learning model to generate the first image.

11. The apparatus of claim 9, wherein the first image is a denoised image, and the memory stores instructions to further cause the processor to:

receive, before receiving the denoised image, a noisy image; and input the noisy image to a third machine learning model to generate the denoised image.

12. The apparatus of claim 9, wherein the classification of the first image and the classification of the second image indicate a document type represented by the first image and the second image.

13. The apparatus of claim 9, wherein:

the first image and the second image are associated with at least one of a structured document type, a semi-structured document type, or an unsupervised document type; and the classification of the first image and the classification of the second image indicate the at least one of the structured document type, the semi-structured document type, or the unsupervised document type.

14. The apparatus of claim 9, wherein:

the first image and the second image are associated with a noise type; and the classification of the first image and the classification of the second image indicate the noise type.

15. The apparatus of claim 9, wherein:

the first image and the second image depict at least one of salt & pepper (S&P) noise, blurred text, faded text, a shading, or a watermark; and the classification of the first image and the classification of the second image indicate the at least one of the S&P noise, the blurred text, the faded text, the shading, or the watermark.

16. The apparatus of claim 9, wherein the memory stores instructions to further cause the processor to:

generate, based on the first image, a first noise intensity value; and generate, based on the second image, a second noise intensity value, the third image being generated based further on a comparison between the first noise intensity value and the second noise intensity value.

17. The apparatus of claim 9, wherein:

a convolutional neural network (CNN) includes at least one of the first machine learning model or the second machine learning model.

18. The apparatus of claim 9, wherein the instructions to cause the processor to generate the second image include instructions to cause the processor to:

compute, via a third machine learning model and based on the first image, a mixture weight for each gate from a plurality of gates associated with a plurality of channels of the first machine learning model, to generate a plurality of mixture weights; and generate the second image based on the plurality of mixture weights.

19. A method, comprising:

receiving, via a processor, a noisy image without a clean image;

generating, via the processor, a denoised image based on the noisy image;

generating, via the processor and based on the denoised image, a noised image and a classification of the denoised image, generating, via the processor and based on the noised image, a classification of the noised image, and generating, via the processor, the clean image based on a comparison between the classification of the denoised image and the classification of the noised image.

20. The method of claim 19, wherein:

the noisy image is associated with a document type; and the classification of the denoised image and the classification of the noised image indicate the document type.

\* \* \* \* \*